United States Patent
Kim et al.

(10) Patent No.: US 11,870,567 B2
(45) Date of Patent: Jan. 9, 2024

(54) METHOD AND APPARATUS FOR CHANNEL STATE INFORMATION FEEDBACK IN COMMUNICATION SYSTEM

(71) Applicant: Electronics and Telecommunications Research Institute, Daejeon (KR)

(72) Inventors: Jung Bin Kim, Daejeon (KR); Dong Hyun Jung, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 0 days.

(21) Appl. No.: 17/409,088

(22) Filed: Aug. 23, 2021

(65) Prior Publication Data
US 2022/0321250 A1 Oct. 6, 2022

(30) Foreign Application Priority Data

Aug. 24, 2020 (KR) .................. 10-2020-0106541
Aug. 18, 2021 (KR) .................. 10-2021-0108867

(51) Int. Cl.
*H04L 1/00* (2006.01)
*H04B 7/06* (2006.01)

(52) U.S. Cl.
CPC .......... *H04L 1/0016* (2013.01); *H04B 7/0626* (2013.01); *H04L 1/0026* (2013.01)

(58) Field of Classification Search
CPC ............................ H04B 7/0626; H04L 1/0026
See application file for complete search history.

(56) References Cited

U.S. PATENT DOCUMENTS

| 10,171,201 | B2 | 1/2019 | Kim et al. |
| 10,506,563 | B2 | 12/2019 | Seo et al. |
| 10,757,726 | B2 | 8/2020 | Nakamura et al. |
| 10,820,218 | B2 | 10/2020 | Maattanen et al. |
| 11,336,391 | B2 * | 5/2022 | Kim ............. H04L 1/0026 |

(Continued)

FOREIGN PATENT DOCUMENTS

WO 2020/150884 7/2020

OTHER PUBLICATIONS

"Text proposal from Email discussion thread #3 for AI 7.2.4.5 Physical layer procedures for sidelink", R1-2004933, 3GPP TSG RAN WG1 #101, Jun. 5, 2020, pp. 1-6.

(Continued)

*Primary Examiner* — Fahmida S Chowdhury
(74) *Attorney, Agent, or Firm* — KILE PARK REED & HOUTTEMAN PLLC

(57) ABSTRACT

An operation method of a base station in a communication system may comprise: transmitting first indication information to a terminal, the first indication information indicating use of a first CQI table among CQI tables; transmitting a first reference signal to the terminal; and receiving first CSI from the terminal, the first CSI including a first CQI index selected within the first CQI table based on the first reference signal, wherein the CQI tables include the first CQI table and a second CQI table, and a spectral efficiency indicated by at least one CQI index within the first CQI table is identical to a spectral efficiency indicated by at least one CQI index within the second CQI table.

17 Claims, 12 Drawing Sheets

(56) References Cited

U.S. PATENT DOCUMENTS

| | | | | |
|---|---|---|---|---|
| 2014/0301306 A1* | 10/2014 | Kim | .................. | H04L 5/0046 |
| | | | | 370/329 |
| 2015/0124901 A1* | 5/2015 | Xu | .................. | H04B 17/00 |
| | | | | 375/267 |
| 2015/0381310 A1* | 12/2015 | Hammarwall | ........ | H04L 1/0026 |
| | | | | 370/329 |
| 2016/0087752 A1* | 3/2016 | Xia | .................. | H04L 1/0026 |
| | | | | 370/329 |
| 2016/0211904 A1* | 7/2016 | Kim | .................. | H04W 24/08 |
| 2016/0254894 A1* | 9/2016 | Tomeba | ............... | H04B 7/0456 |
| | | | | 370/329 |
| 2016/0337023 A1* | 11/2016 | Yi | .................. | H04B 7/0632 |
| 2020/0106550 A1* | 4/2020 | Yoshimoto | ............ | H04L 1/0016 |
| 2020/0145126 A1 | 5/2020 | Nammi | | |
| 2020/0322816 A1* | 10/2020 | Xu | .................. | H04W 24/02 |
| 2020/0366406 A1* | 11/2020 | Kim | .................. | H04L 5/0057 |
| 2020/0412431 A1* | 12/2020 | Park | .................. | H04B 7/0469 |
| 2020/0413418 A1 | 12/2020 | Li et al. | | |
| 2021/0013991 A1* | 1/2021 | Park | .................. | H04W 72/23 |
| 2021/0194622 A1* | 6/2021 | Takeda | .................. | H04L 1/0016 |

OTHER PUBLICATIONS

"NR; Physical layer procedures for data", 3GPP TS 38.214, Jun. 2020, pp. 1-163, vol. 16.
3GPP TR 38.821; 3rd Generation Partnership Project; Technical Specification Group Radio Access Network; Solutions for NR to support non-terrestrial networks (NTN), (Release 16); Dec. 2019.

* cited by examiner

FIG. 3 all CQI information

| modulation scheme | code rate x 1024 | spectral efficiency |
|---|---|---|
| QPSK | 30 | 0.0586 |
| QPSK | 50 | 0.0977 |
| QPSK | 78 | 0.1523 |
| QPSK | 120 | 0.2344 |
| QPSK | 193 | 0.377 |
| QPSK | 308 | 0.6016 |
| QPSK | 449 | 0.877 |
| QPSK | 602 | 1.1758 |
| 16QAM | 378 | 1.4766 |
| 16QAM | 490 | 1.9141 |
| 16QAM | 616 | 2.4063 |
| 64QAM | 466 | 2.7305 |
| 64QAM | 567 | 3.3223 |
| 64QAM | 666 | 3.9023 |
| 64QAM | 772 | 4.5234 |
| 64QAM | 873 | 5.1152 |
| 64QAM | 948 | 5.5547 |
| 256QAM | 711 | 5.5547 |
| 256QAM | 797 | 6.2266 |
| 256QAM | 885 | 6.9141 |
| 256QAM | 948 | 7.4063 | the same spectral efficiency (64QAM 948 / 256QAM 711)

all MCS levels

| modulation scheme | code rate x 1024 | spectral efficiency | | |
|---|---|---|---|---|
| QPSK | 30 | 0.0586 | 16QAM | 553 | 2.1602 |
| QPSK | 40 | 0.0781 | 16QAM | 616 | 2.4063 |
| QPSK | 50 | 0.0977 | 64QAM | 438 | 2.5664 |
| QPSK | 64 | 0.125 | 64QAM | 466 | 2.7305 |
| QPSK | 78 | 0.1523 | 64QAM | 517 | 3.0293 |
| QPSK | 99 | 0.1934 | 64QAM | 567 | 3.3223 |
| QPSK | 120 | 0.2344 | 64QAM | 616 | 3.6094 |
| QPSK | 157 | 0.3066 | 64QAM | 666 | 3.9023 |
| QPSK | 193 | 0.377 | 64QAM | 719 | 4.2129 |
| QPSK | 251 | 0.4902 | 64QAM | 772 | 4.5234 |
| QPSK | 308 | 0.6016 | 64QAM | 822 | 4.8164 |
| QPSK | 379 | 0.7402 | 64QAM | 873 | 5.1152 |
| QPSK | 449 | 0.877 | 64QAM | 910 | 5.332 |
| QPSK | 526 | 1.0273 | 256QAM | 711 | 5.5547 |
| QPSK | 602 | 1.1758 | 256QAM | 754 | 5.8906 |
| QPSK | 679 | 1.3262 | 256QAM | 797 | 6.2266 |
| 16QAM | 378 | 1.4766 | 256QAM | 841 | 6.5703 |
| 16QAM | 434 | 1.6953 | 256QAM | 885 | 6.9141 |
| 16QAM | 490 | 1.9141 | 256QAM | 916.5 | 7.1602 |
| | | | 256QAM | 948 | 7.4063 |

FIG. 4

| modulation scheme | code rate x 1024 | spectral efficiency | spectral efficiency gap |
|---|---|---|---|
| QPSK | 30 | 0.0586 | 0.0195 |
| QPSK | 40 | 0.0781 | 0.0196 |
| QPSK | 50 | 0.0977 | 0.0273 |
| QPSK | 64 | 0.125 | 0.0273 |
| QPSK | 78 | 0.1523 | 0.0411 |
| QPSK | 99 | 0.1934 | 0.041 |
| QPSK | 120 | 0.2344 | 0.0722 |
| QPSK | 157 | 0.3066 | 0.0704 |
| QPSK | 193 | 0.377 | 0.1132 |
| QPSK | 251 | 0.4902 | 0.1114 |
| QPSK | 308 | 0.6016 | 0.1386 |
| QPSK | 379 | 0.7402 | 0.1368 |
| QPSK | 449 | 0.877 | 0.1503 |
| QPSK | 526 | 1.0273 | 0.1485 |
| QPSK | 602 | 1.1758 | 0.1504 |
| QPSK | 679 | 1.3262 | 0.1504 |
| 16QAM | 378 | 1.4766 | 0.2187 |
| 16QAM | 434 | 1.6953 | 0.2188 |
| 16QAM | 490 | 1.9141 | 0.2461 |
| 16QAM | 553 | 2.1602 | 0.2461 |
| 16QAM | 616 | 2.4063 | 0.1601 |
| 64QAM | 438 | 2.5664 | 0.1641 |
| 64QAM | 466 | 2.7305 | 0.2988 |
| 64QAM | 517 | 3.0293 | 0.293 |
| 64QAM | 567 | 3.3223 | 0.2871 |
| 64QAM | 616 | 3.6094 | 0.2929 |
| 64QAM | 666 | 3.9023 | 0.3106 |
| 64QAM | 719 | 4.2129 | 0.3105 |
| 64QAM | 772 | 4.5234 | 0.293 |
| 64QAM | 822 | 4.8164 | 0.2988 |
| 64QAM | 873 | 5.1152 | 0.2168 |
| 64QAM | 910 | 5.332 | 0.2227 |
| 256QAM | 711 | 5.5547 | 0.3359 |
| 256QAM | 754 | 5.8906 | 0.336 |
| 256QAM | 797 | 6.2266 | 0.3437 |
| 256QAM | 841 | 6.5703 | 0.3438 |
| 256QAM | 885 | 6.9141 | 0.2461 |
| 256QAM | 916.5 | 7.1602 | 0.2461 |
| 256QAM | 948 | 7.4063 | |

FIG. 6

CQI table 1

| CQI index | modulation scheme | code rate x 1024 | spectral efficiency |
|---|---|---|---|
| 0 | out of range | | |
| 1 | QPSK | 30 | 0.0586 |
| 2 | QPSK | 40 | 0.0781 |
| 3 | QPSK | 50 | 0.0977 |
| 4 | QPSK | 64 | 0.125 |
| 5 | QPSK | 78 | 0.1523 |
| 6 | QPSK | 99 | 0.1934 |
| 7 | QPSK | 120 | 0.2344 |
| 8 | QPSK | 157 | 0.3066 |
| 9 | QPSK | 193 | 0.377 |
| 10 | QPSK | 251 | 0.4902 |
| 11 | QPSK | 308 | 0.6016 |
| 12 | QPSK | 379 | 0.7402 |
| 13 | QPSK | 449 | 0.877 |
| 14 | QPSK | 526 | 1.0273 |
| 15 | QPSK | 602 | 1.1758 | overlapping section

CQI table 2

| CQI index | modulation scheme | code rate x 1024 | spectral efficiency |
|---|---|---|---|
| 0 | out of range | | |
| 1 | QPSK | 449 | 0.877 |
| 2 | QPSK | 526 | 1.0273 |
| 3 | QPSK | 602 | 1.1758 |
| 4 | QPSK | 679 | 1.3262 |
| 5 | 16QAM | 378 | 1.4766 |
| 6 | 16QAM | 434 | 1.6953 |
| 7 | 16QAM | 490 | 1.9141 |
| 8 | 16QAM | 553 | 2.1602 |
| 9 | 16QAM | 616 | 2.4063 |
| 10 | 64QAM | 438 | 2.5664 |
| 11 | 64QAM | 466 | 2.7305 |
| 12 | 64QAM | 517 | 3.0293 |
| 13 | 64QAM | 567 | 3.3223 |
| 14 | 64QAM | 616 | 3.6094 |
| 15 | 64QAM | 666 | 3.9023 | overlapping section

CQI table 3

| CQI index | modulation scheme | code rate x 1024 | spectral efficiency |
|---|---|---|---|
| 0 | out of range | | |
| 1 | 64QAM | 567 | 3.3223 |
| 2 | 64QAM | 616 | 3.6094 |
| 3 | 64QAM | 666 | 3.9023 |
| 4 | 64QAM | 719 | 4.2129 |
| 5 | 64QAM | 772 | 4.5234 |
| 6 | 64QAM | 822 | 4.8164 |
| 7 | 64QAM | 873 | 5.1152 |
| 8 | 64QAM | 910 | 5.332 |
| 9 | 256QAM | 711 | 5.5547 |
| 10 | 256QAM | 754 | 5.8906 |
| 11 | 256QAM | 797 | 6.2266 |
| 12 | 256QAM | 841 | 6.5703 |
| 13 | 256QAM | 885 | 6.9141 |
| 14 | 256QAM | 916.5 | 7.1602 |
| 15 | 256QAM | 948 | 7.4063 |

FIG. 7 table 1

| CQI index | modulation scheme | code rate x 1024 |
|---|---|---|
| 0 | out of range | |
| 1 | QPSK | 30 |
| 2 | QPSK | 40 |
| 3 | QPSK | 50 |
| 4 | QPSK | 64 |
| 5 | QPSK | 78 |
| 6 | QPSK | 99 |
| 7 | QPSK | 120 |
| 8 | QPSK | 157 |
| 9 | QPSK | 193 |
| 10 | QPSK | 251 |
| 11 | QPSK | 308 |
| 12 | QPSK | 379 |
| 13 | QPSK | 449 |
| 14 | QPSK | 526 |
| 15 | QPSK | 602 | overlapping section table 2

| CQI index | modulation scheme | code rate x 1024 |
|---|---|---|
| 0 | out of range | |
| 1 | QPSK | 193 |
| 2 | QPSK | 251 |
| 3 | QPSK | 308 |
| 4 | QPSK | 379 |
| 5 | QPSK | 449 |
| 6 | QPSK | 526 |
| 7 | QPSK | 602 |
| 8 | QPSK | 679 |
| 9 | 16QAM | 378 |
| 10 | 16QAM | 434 |
| 11 | 16QAM | 490 |
| 12 | 16QAM | 553 |
| 13 | 16QAM | 616 |
| 14 | 64QAM | 438 |
| 15 | 64QAM | 466 | overlapping section table 3

| CQI index | modulation scheme | code rate x 1024 |
|---|---|---|
| 0 | out of range | |
| 1 | 16QAM | 378 |
| 2 | 16QAM | 434 |
| 3 | 16QAM | 490 |
| 4 | 16QAM | 553 |
| 5 | 16QAM | 616 |
| 6 | 64QAM | 438 |
| 7 | 64QAM | 466 |
| 8 | 64QAM | 517 |
| 9 | 64QAM | 567 |
| 10 | 64QAM | 616 |
| 11 | 64QAM | 666 |
| 12 | 64QAM | 719 |
| 13 | 64QAM | 772 |
| 14 | 64QAM | 822 |
| 15 | 64QAM | 873 | overlapping section table 4

| CQI index | modulation scheme | code rate x 1024 |
|---|---|---|
| 0 | out of range | |
| 1 | 64QAM | 567 |
| 2 | 64QAM | 616 |
| 3 | 64QAM | 666 |
| 4 | 64QAM | 719 |
| 5 | 64QAM | 772 |
| 6 | 64QAM | 822 |
| 7 | 64QAM | 873 |
| 8 | 64QAM | 910 |
| 9 | 256QAM | 711 |
| 10 | 256QAM | 754 |
| 11 | 256QAM | 797 |
| 12 | 256QAM | 841 |
| 13 | 256QAM | 885 |
| 14 | 256QAM | 916.5 |
| 15 | 256QAM | 948 |

FIG. 10 table 1

| CQI index | modulation scheme | code rate x 1024 |
|---|---|---|
| 0 | out of range (CQI down-change required) | |
| 1 | QPSK | 30 |
| 2 | QPSK | 40 |
| 3 | QPSK | 50 |
| 4 | QPSK | 64 |
| 5 | QPSK | 78 |
| 6 | QPSK | 99 |
| 7 | QPSK | 120 |
| 8 | QPSK | 157 |
| 9 | QPSK | 193 |
| 10 | QPSK | 251 |
| 11 | QPSK | 308 |
| 12 | QPSK | 379 |
| 13 | QPSK | 449 |
| 14 | QPSK | 526 |
| 15 | out of range (CQI up-change required) | | overlapping section table 2

| CQI index | modulation scheme | code rate x 1024 |
|---|---|---|
| 0 | out of range (CQI down-change required) | |
| 1 | QPSK | 449 |
| 2 | QPSK | 526 |
| 3 | QPSK | 602 |
| 4 | QPSK | 679 |
| 5 | 16QAM | 378 |
| 6 | 16QAM | 434 |
| 7 | 16QAM | 490 |
| 8 | 16QAM | 553 |
| 9 | 16QAM | 616 |
| 10 | 64QAM | 438 |
| 11 | 64QAM | 466 |
| 12 | 64QAM | 517 |
| 13 | 64QAM | 567 |
| 14 | 64QAM | 616 |
| 15 | out of range (CQI up-change required) | | overlapping section table 3

| CQI index | modulation scheme | code rate x 1024 |
|---|---|---|
| 0 | out of range (CQI down-change required) | |
| 1 | 64QAM | 616 |
| 2 | 64QAM | 666 |
| 3 | 64QAM | 719 |
| 4 | 64QAM | 772 |
| 5 | 64QAM | 822 |
| 6 | 64QAM | 873 |
| 7 | 64QAM | 910 |
| 8 | 256QAM | 711 |
| 9 | 256QAM | 754 |
| 10 | 256QAM | 797 |
| 11 | 256QAM | 841 |
| 12 | 256QAM | 885 |
| 13 | 256QAM | 916.5 |
| 14 | 256QAM | 948 |
| 15 | out of range (CQI up-change required) | |

FIG. 11

| table 1 | | |
|---|---|---|
| CQI index | modulation scheme | code rate x 1024 |
| 0 | out of range (CQI down-change required) | |
| 1 | QPSK | 30 |
| 2 | QPSK | 40 |
| 3 | QPSK | 50 |
| 4 | QPSK | 64 |
| 5 | QPSK | 78 |
| 6 | QPSK | 99 |
| 7 | QPSK | 120 |
| 8 | QPSK | 157 |
| 9 | QPSK | 193 |
| 10 | QPSK | 251 |
| 11 | QPSK | 308 |
| 12 | QPSK | 379 |
| 13 | QPSK | 449 |
| 14 | QPSK | 526 |
| 15 | out of range (CQI up-change required) | | overlapping section

| table 2 | | |
|---|---|---|
| CQI index | modulation scheme | code rate x 1024 |
| 0 | out of range (CQI down-change required) | |
| 1 | QPSK | 193 |
| 2 | QPSK | 251 |
| 3 | QPSK | 308 |
| 4 | QPSK | 379 |
| 5 | QPSK | 449 |
| 6 | QPSK | 526 |
| 7 | QPSK | 602 |
| 8 | QPSK | 679 |
| 9 | 16QAM | 378 |
| 10 | 16QAM | 434 |
| 11 | 16QAM | 490 |
| 12 | 16QAM | 553 |
| 13 | 16QAM | 616 |
| 14 | 64QAM | 438 |
| 15 | out of range (CQI up-change required) | | overlapping section

| table 3 | | |
|---|---|---|
| CQI index | modulation scheme | code rate x 1024 |
| 0 | out of range (CQI down-change required) | |
| 1 | 16QAM | 378 |
| 2 | 16QAM | 434 |
| 3 | 16QAM | 490 |
| 4 | 16QAM | 553 |
| 5 | 16QAM | 616 |
| 6 | 64QAM | 438 |
| 7 | 64QAM | 466 |
| 8 | 64QAM | 517 |
| 9 | 64QAM | 567 |
| 10 | 64QAM | 616 |
| 11 | 64QAM | 666 |
| 12 | 64QAM | 719 |
| 13 | 64QAM | 772 |
| 14 | 64QAM | 822 |
| 15 | out of range (CQI up-change required) | | overlapping section

| table 4 | | |
|---|---|---|
| CQI index | modulation scheme | code rate x 1024 |
| 0 | out of range (CQI down-change required) | |
| 1 | 64QAM | 616 |
| 2 | 64QAM | 666 |
| 3 | 64QAM | 719 |
| 4 | 64QAM | 772 |
| 5 | 64QAM | 822 |
| 6 | 64QAM | 873 |
| 7 | 64QAM | 910 |
| 8 | 256QAM | 711 |
| 9 | 256QAM | 754 |
| 10 | 256QAM | 797 |
| 11 | 256QAM | 841 |
| 12 | 256QAM | 885 |
| 13 | 256QAM | 916.5 |
| 14 | 256QAM | 948 |
| 15 | out of range (CQI up-change required) | |

FIG. 12

| table 1 | | |
|---|---|---|
| CQI index | modulation scheme | code rate × 1024 |
| 0 | out of range | |
| 1 | QPSK | 30 |
| 2 | QPSK | 40 |
| 3 | QPSK | 50 |
| 4 | QPSK | 64 |
| 5 | QPSK | 78 |
| 6 | QPSK | 99 |
| 7 | QPSK | 120 |
| 8 | QPSK | 157 |
| 9 | QPSK | 193 |
| 10 | QPSK | 251 |
| 11 | QPSK | 308 |
| 12 | QPSK | 379 |
| 13 | QPSK | 449 |
| 14 | QPSK | 526 |
| 15 | change to CQI table 2 | | overlapping section

| table 2 | | |
|---|---|---|
| CQI index | modulation scheme | code rate × 1024 |
| 0 | down-change CQI table | |
| 1 | QPSK | 193 |
| 2 | QPSK | 251 |
| 3 | QPSK | 308 |
| 4 | QPSK | 379 |
| 5 | QPSK | 449 |
| 6 | QPSK | 526 |
| 7 | QPSK | 602 |
| 8 | QPSK | 679 |
| 9 | 16QAM | 378 |
| 10 | 16QAM | 434 |
| 11 | 16QAM | 490 |
| 12 | 16QAM | 553 |
| 13 | 16QAM | 616 |
| 14 | 64QAM | 438 |
| 15 | change to CQI table 3 | | overlapping section

| table 3 | | |
|---|---|---|
| CQI index | modulation scheme | code rate × 1024 |
| 0 | change to CQI table 1 | |
| 1 | change to CQI table 2 | |
| 2 | 16QAM | 434 |
| 3 | 16QAM | 490 |
| 4 | 16QAM | 553 |
| 5 | 16QAM | 616 |
| 6 | 64QAM | 438 |
| 7 | 64QAM | 466 |
| 8 | 64QAM | 517 |
| 9 | 64QAM | 567 |
| 10 | 64QAM | 616 |
| 11 | 64QAM | 666 |
| 12 | 64QAM | 719 |
| 13 | 64QAM | 772 |
| 14 | 64QAM | 822 |
| 15 | change to CQI table 4 | | overlapping section

| table 4 | | |
|---|---|---|
| CQI index | modulation scheme | code rate × 1024 |
| 0 | change to CQI table 1 | |
| 1 | change to CQI table 2 | |
| 2 | change to CQI table 3 | |
| 3 | 64QAM | 719 |
| 4 | 64QAM | 772 |
| 5 | 64QAM | 822 |
| 6 | 64QAM | 873 |
| 7 | 64QAM | 910 |
| 8 | 256QAM | 711 |
| 9 | 256QAM | 754 |
| 10 | 256QAM | 797 |
| 11 | 256QAM | 841 |
| 12 | 256QAM | 885 |
| 13 | 256QAM | 916.5 |
| 14 | 256QAM | 948 |
| 15 | out of range | |

METHOD AND APPARATUS FOR CHANNEL STATE INFORMATION FEEDBACK IN COMMUNICATION SYSTEM

CROSS-REFERENCE TO RELATED APPLICATIONS

This application claims priority to Korean Patent Applications No. 10-2020-0106541 filed on Aug. 24, 2020 and No. 10-2021-0108867 filed on Aug. 18, 2021 with the Korean Intellectual Property Office (KIPO), the entire contents of which are hereby incorporated by reference.

BACKGROUND

1. Technical Field

The present disclosure relates to a channel state information (CSI) feedback technique, and more particularly, to a CSI feedback technique in a communication system, which can prevent performance degradation in an environment where a CSI aging may occur.

2. Related Art

With the development of information and communication technology, various wireless communication technologies have been developed. As a representative wireless communication technology, there may be long term evolution (LTE), new radio (NR), or the like defined as the 3rd generation partnership project (3GPP) specification. The LTE may be one of 4th generation (4G) wireless communication technologies, and the NR may be one of $5^{th}$ generation (5G) wireless communication technologies.

In order to process wireless data that increases rapidly after commercialization of the fourth generation (4G) communication system (e.g., long term evolution (LTE) communication system or LTE-Advanced (LTE-A) communication system), a fifth generation (5G) communication system (e.g., new radio (NR) communication system) using not only a frequency band (e.g., frequency band of 6 GHz or below) of the 4G communication system but also a frequency band (e.g., frequency band of 6 GHz or above) higher than the frequency band of the 4G communication system is being considered. The 5G communication system may support enhanced Mobile BroadBand (eMBB), Ultra-Reliable and Low Latency Communication (URLLC), and massive Machine Type Communication (mMTC).

Meanwhile, the communication system may use a function of transmitting data adaptively according to a channel environment between a terminal and a base station in order to enhance transmission performances, such as a data transmission rate and an error probability. For example, the 5G communication system may use an adaptive modulation and coding (AMC) scheme for adaptively determining a modulation order and a channel coding rate of data based on channel state information (CSI) between a specific terminal and a base station. Such the AMC scheme of the 5G communication system may significantly degrade transmission performances in an environment in which a CSI aging occurs.

SUMMARY

Accordingly, exemplary embodiments of the present disclosure are directed to providing a method and an apparatus for CSI feedback in a communication system, which can prevent performance degradation by supporting modulation and coding scheme (MCS) levels having various granularities in an environment where a CSI aging may occur.

According to a first exemplary embodiment of the present disclosure, an operation method of a base station in a communication system may comprise: transmitting first indication information to a terminal, the first indication information indicating use of a first channel quality information (CQI) table among CQI tables; transmitting a first reference signal to the terminal; and receiving first channel state information (CSI) from the terminal, the first CSI including a first CQI index selected within the first CQI table based on the first reference signal, wherein the CQI tables include the first CQI table and a second CQI table, and a spectral efficiency indicated by at least one CQI index within the first CQI table is identical to a spectral efficiency indicated by at least one CQI index within the second CQI table.

The operation method may further comprise, before the transmitting of the first indication information to the terminal, transmitting configuration information of the CQI tables to the terminal.

The first indication information may further include information indicating a valid time interval of the first CQI table indicated by the first indication information, and the first CQI table may be used for reporting the first CSI within the valid time interval.

The first indication information may further include triggering information indicating a scheme of changing a CQI table used for CSI reporting, the CQI table may be changed by the base station when the triggering information indicates a first scheme, and the CQI table may be changed by the terminal when the triggering information indicates a second scheme.

Each of the CQI tables may further include a table change request index for requesting a CQI table change, the first indication information may further include triggering information indicating a scheme of changing a CQI table, the CQI table may be changed by the base station when the triggering information indicates a first scheme, and the CQI table may be changed by the terminal when the triggering information indicates a second scheme.

The operation method may further comprise, when the first CQI index is the table change request index and the first scheme is used, transmitting second indication information indicating use of a third CQI table to the terminal.

When the first CQI index is the table change request index and the second scheme is used, the first CSI may further include a third CQI index selected within a third CQI table.

The operation method may further comprise: determining an MCS level based on the first CQI index; and transmitting downlink control information (DCI) including the MCS level based on the first CQI index to the terminal.

According to a second exemplary embodiment of the present disclosure, an operation method of a terminal in a communication system may comprise: receiving first indication information from a base station, the first indication information indicating use of a first channel quality information (CQI) table among CQI tables; receiving a first reference signal from the base station; selecting a first CQI index within the first CQI table based on the first reference signal; and transmitting first channel state information (CSI) to the base station, the first CSI including the first CQI index, wherein the CQI tables include the first CQI table and a second CQI table, and a spectral efficiency indicated by at least one CQI index within the first CQI table is identical to a spectral efficiency indicated by at least one CQI index within the second CQI table.

The operation method may further comprise, before the receiving of the first indication information, receiving configuration information of the CQI tables from the base station.

The first indication information may further include triggering information indicating a scheme of changing a CQI table used for CSI reporting, the CQI table may be changed by the base station when the triggering information indicates a first scheme, and the CQI table may be changed by the terminal when the triggering information indicates a second scheme.

Each of the CQI tables may further include at least one table change request index for requesting a CQI table change, the first indication information may further include triggering information indicating a scheme of changing a CQI table, the CQI table may be changed by the base station when the triggering information indicates a first scheme, and the CQI table may be changed by the terminal when the triggering information indicates a second scheme.

The operation method may further comprise: when the first CQI index is the table change request index and the second scheme is used, selecting a third CQI index within a third CQI table based on the first reference signal; and transmitting third CSI including the selected third CQI index to the base station.

According to a third exemplary embodiment of the present disclosure, a terminal may comprise: a processor; a memory electronically communicating with the processor; and instructions stored in the memory, wherein when executed by the processor, the instructions cause the terminal to: receive first indication information from a base station, the first indication information indicating use of a first channel quality information (CQI) table among CQI tables; receive a first reference signal from the base station; select a first CQI index within the first CQI table based on the first reference signal; and transmit first channel state information (CSI) to the base station, the first CSI including the first CQI index, wherein the CQI tables include the first CQI table and a second CQI table, and a spectral efficiency indicated by at least one CQI index within the first CQI table is identical to a spectral efficiency indicated by at least one CQI index within the second CQI table.

The first indication information may further include triggering information indicating a scheme of changing a CQI table used for CSI reporting, the CQI table may be changed by the base station when the triggering information indicates a first scheme, and the CQI table may be changed by the terminal when the triggering information indicates a second scheme.

Each of the CQI tables may further include at least one table change request index for requesting a CQI table change, the first indication information may further include triggering information indicating a scheme of changing a CQI table, the CQI table may be changed by the base station when the triggering information indicates a first scheme, and the CQI table may be changed by the terminal when the triggering information indicates a second scheme.

The instructions may further cause the terminal to: when the first CQI index is the table change request index and the second scheme is used, select a third CQI index within a third CQI table based on the first reference signal; and transmit third CSI including the selected third CQI index to the base station.

The communication system may provide CQI tables having overlapping sections where high-order CQI indexes and low-order CQI indexes partially overlap with each other to the terminal, thereby enabling operations of MCS levels having various granularities. In addition, a CQI index(s) within a CQI table may be used to indicate a change of the CQI table. Accordingly, the terminal may request a change of the CQI table by delivering a specific CQI index within the CQI table to the base station. As such, as the communication system enables operations of MCS levels having various granularities, transmission performances can be improved in a radio wave environment in which a CSI aging occurs.

BRIEF DESCRIPTION OF DRAWINGS

FIG. 3 is a conceptual diagram illustrating relationship between all CQI information and all MCS levels.

FIG. 4 is a conceptual diagram illustrating a gap in spectral efficiencies of all MCS levels.

FIG. 6 is a conceptual diagram illustrating a first exemplary embodiment of a method for configuring CQI tables having overlapping section(s).

FIG. 7 is a conceptual diagram illustrating a second exemplary embodiment of a method for configuring CQI tables having overlapping section(s).

FIG. 10 is a conceptual diagram illustrating a first exemplary embodiment of a method for configuring CQI tables having overlapping sections, each of which includes CQI table change information.

FIG. 11 is a conceptual diagram illustrating a second exemplary embodiment of a method for configuring CQI tables having overlapping sections, each of which includes CQI table change information.

FIG. 12 is a conceptual diagram illustrating a third exemplary embodiment of a method for configuring CQI tables having overlapping sections, each of which includes CQI table change information.

DETAILED DESCRIPTION OF THE EMBODIMENTS

Figure 1:
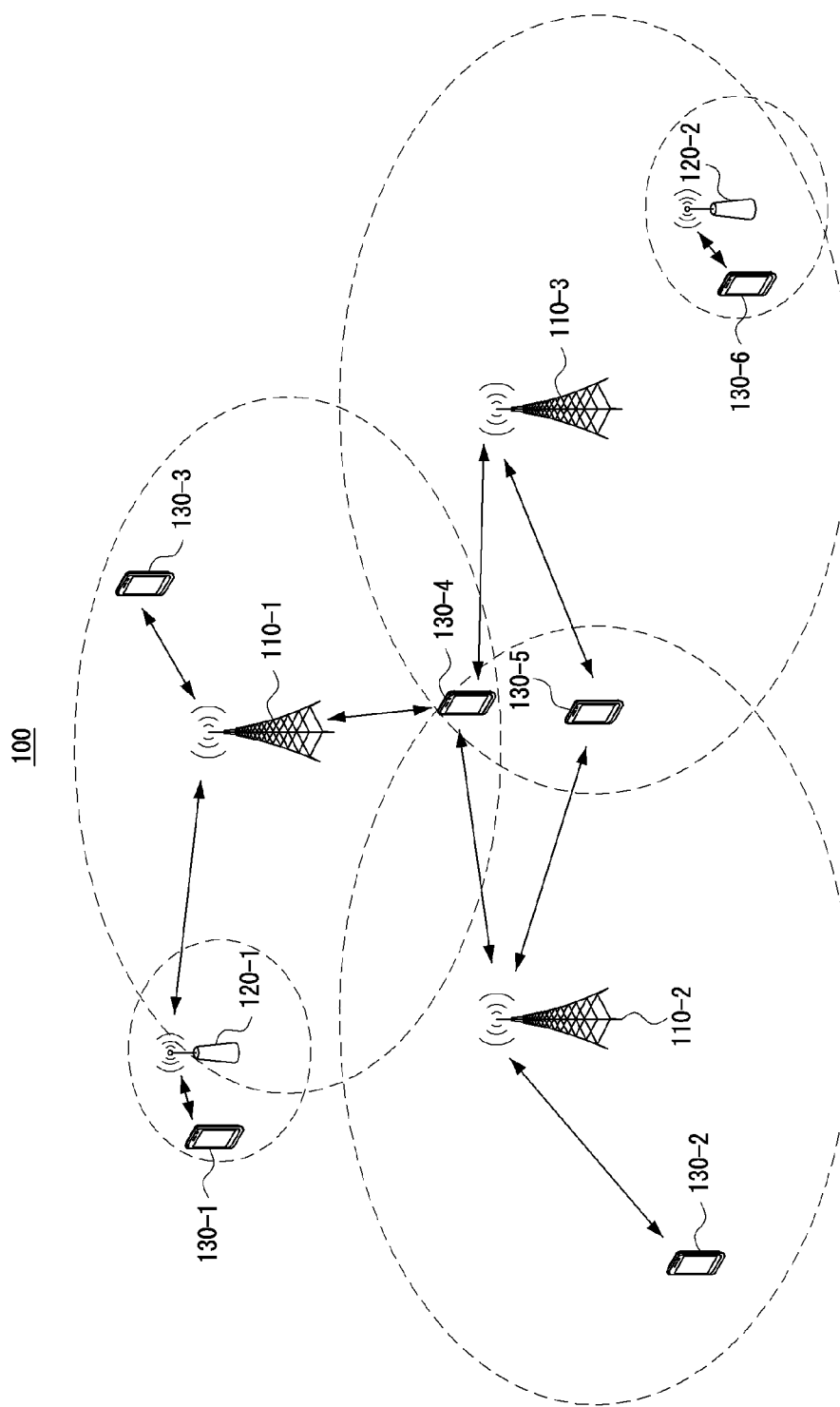
FIG. 1 is a conceptual diagram illustrating a first exemplary embodiment of a communication system.

Embodiments of the present disclosure are disclosed herein. However, specific structural and functional details disclosed herein are merely representative for purposes of describing embodiments of the present disclosure. Thus, embodiments of the present disclosure may be embodied in many alternate forms and should not be construed as limited to embodiments of the present disclosure set forth herein.

Accordingly, while the present disclosure is capable of various modifications and alternative forms, specific embodiments thereof are shown by way of example in the drawings and will herein be described in detail. It should be understood, however, that there is no intent to limit the present disclosure to the particular forms disclosed, but on the contrary, the present disclosure is to cover all modifications, equivalents, and alternatives falling within the spirit and scope of the present disclosure. Like numbers refer to like elements throughout the description of the figures.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present disclosure. As used herein, the term "and/or" includes any and all combinations of one or more of the associated listed items.

In exemplary embodiments of the present disclosure, "at least one of A and B" may refer to "at least one A or B" or "at least one of one or more combinations of A and B". In addition, "one or more of A and B" may refer to "one or more of A or B" or "one or more of one or more combinations of A and B".

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (i.e., "between" versus "directly between," "adjacent" versus "directly adjacent," etc.).

The terminology used herein is for the purpose of describing particular embodiments only and is not intended to be limiting of the present disclosure. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this present disclosure belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, exemplary embodiments of the present disclosure will be described in greater detail with reference to the accompanying drawings. In order to facilitate general understanding in describing the present disclosure, the same components in the drawings are denoted with the same reference signs, and repeated description thereof will be omitted.

FIG. 1 is a conceptual diagram illustrating a first exemplary embodiment of a communication system.

Referring to FIG. 1, a communication system 100 may comprise a plurality of communication nodes 110-1, 110-2, 110-3, 120-1, 120-2, 130-1, 130-2, 130-3, 130-4, 130-5, and 130-6. Here, the communication system may be referred to as a 'communication network'. Each of the plurality of communication nodes may support at least one communication protocol. For example, each of the plurality of communication nodes 110 to 130 may support communication protocols defined in the 3rd generation partnership project (3GPP) technical specifications (e.g., LTE communication protocol, LTE-A communication protocol, NR communication protocol, or the like). The plurality of communication nodes 110 to 130 may support code division multiple access (CDMA) based communication protocol, wideband CDMA (WCDMA) based communication protocol, time division multiple access (TDMA) based communication protocol, frequency division multiple access (FDMA) based communication protocol, orthogonal frequency division multiplexing (OFDM) based communication protocol, filtered OFDM based communication protocol, cyclic prefix OFDM (CP-OFDM) based communication protocol, discrete Fourier transform-spread-OFDM (DFT-s-OFDM) based communication protocol, orthogonal frequency division multiple access (OFDMA) based communication protocol, single carrier FDMA (SC-FDMA) based communication protocol, non-orthogonal multiple access (NOMA) based communication protocol, generalized frequency division multiplexing (GFDM) based communication protocol, filter band multi-carrier (FBMC) based communication protocol, universal filtered multi-carrier (UFMC) based communication protocol, space division multiple access (SDMA) based communication protocol, or the like. Each of the plurality of communication nodes may have the following structure.

Figure 2:
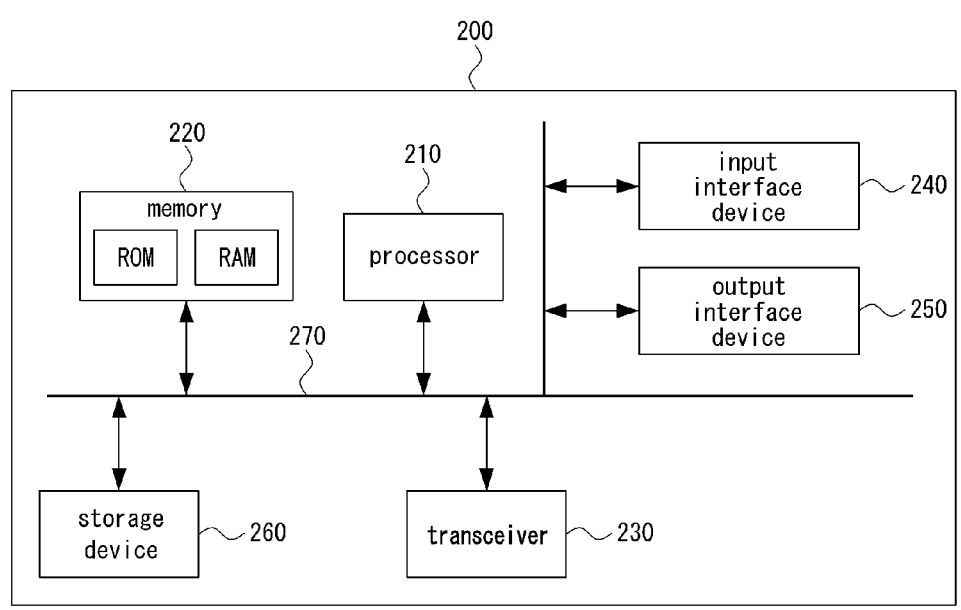
FIG. 2 is a block diagram illustrating a first exemplary embodiment of a communication node constituting a communication system.

FIG. 2 is a block diagram illustrating a first exemplary embodiment of a communication node constituting a communication system.

Referring to FIG. 2, a communication node 200 may comprise at least one processor 210, a memory 220, and a transceiver 230 connected to the network for performing communications. Also, the communication node 200 may further comprise an input interface device 240, an output interface device 250, a storage device 260, and the like. Each component included in the communication node 200 may communicate with each other as connected through a bus 270. However, each of the components included in the communication node 200 may be connected not to the common bus 270 but to the processor 210 through an individual interface or an individual bus. For example, the processor 210 may be connected to at least one of the memory 220, the transceiver 230, the input interface device 240, the output interface device 250, and the storage device 260 through dedicated interfaces.

The processor 210 may execute a program stored in at least one of the memory 220 and the storage device 260. The processor 210 may refer to a central processing unit (CPU), a graphics processing unit (GPU), or a dedicated processor on which methods in accordance with embodiments of the present disclosure are performed. Each of the memory 220 and the storage device 260 may be constituted by at least one of a volatile storage medium and a non-volatile storage medium. For example, the memory 220 may comprise at least one of read-only memory (ROM) and random access memory (RAM).

Referring again to FIG. 1, the communication system 100 may comprise a plurality of base stations 110-1, 110-2, 110-3, 120-1, and 120-2, and a plurality of terminals 130-1, 130-2, 130-3, 130-4, 130-5, and 130-6. Each of the first base station 110-1, the second base station 110-2, and the third base station 110-3 may form a macro cell, and each of the fourth base station 120-1 and the fifth base station 120-2 may form a small cell. The fourth base station 120-1, the third terminal 130-3, and the fourth terminal 130-4 may belong to the cell coverage of the first base station 110-1. Also, the second terminal 130-2, the fourth terminal 130-4, and the fifth terminal 130-5 may belong to the cell coverage of the second base station 110-2. Also, the fifth base station 120-2, the fourth terminal 130-4, the fifth terminal 130-5, and the sixth terminal 130-6 may belong to the cell coverage of the third base station 110-3. Also, the first terminal 130-1 may belong to the cell coverage of the fourth base station 120-1, and the sixth terminal 130-6 may belong to the cell coverage of the fifth base station 120-2.

Here, each of the plurality of base stations 110-1, 110-2, 110-3, 120-1, and 120-2 may be referred to as NodeB (NB), evolved NodeB (eNB), gNB, advanced base station (ABS), high reliability-base station (HR-BS), base transceiver station (BTS), radio base station, radio transceiver, access point (AP), access node, radio access station (RAS), mobile multihop relay-base station (MMR-BS), relay station (RS), advanced relay station (ARS), high reliability-relay station (HR-RS), home NodeB (HNB), home eNodeB (HeNB), road side unit (RSU), radio remote head (RRH), transmission point (TP), transmission and reception point (TRP), relay node, or the like. Each of the plurality of terminals 130-1, 130-2, 130-3, 130-4, 130-5, and 130-6 may be referred to as user equipment (UE), terminal equipment (TE), advanced mobile station (AMS), high reliability-mobile station (HR-MS), terminal, access terminal, mobile terminal, station, subscriber station, mobile station, portable subscriber station, node, device, on-board unit (OBU), or the like.

Each of the plurality of communication nodes 110-1, 110-2, 110-3, 120-1, 120-2, 130-1, 130-2, 130-3, 130-4, 130-5, and 130-6 may support cellular communication (e.g., LTE, LTE-Advanced (LTE-A), etc.) defined in the 3rd generation partnership project (3GPP) specification. Each of the plurality of base stations 110-1, 110-2, 110-3, 120-1, and 120-2 may operate in the same frequency band or in different frequency bands. The plurality of base stations 110-1, 110-2, 110-3, 120-1, and 120-2 may be connected to each other via an ideal backhaul link or a non-ideal backhaul link, and exchange information with each other via the ideal or non-ideal backhaul. Also, each of the plurality of base stations 110-1, 110-2, 110-3, 120-1, and 120-2 may be connected to the core network through the ideal backhaul link or non-ideal backhaul link. Each of the plurality of base stations 110-1, 110-2, 110-3, 120-1, and 120-2 may transmit a signal received from the core network to the corresponding terminal 130-1, 130-2, 130-3, 130-4, 130-5, or 130-6, and transmit a signal received from the corresponding terminal 130-1, 130-2, 130-3, 130-4, 130-5, or 130-6 to the core network.

Each of the plurality of base stations 110-1, 110-2, 110-3, 120-1, and 120-2 may support OFDMA-based downlink (DL) transmission, and SC-FDMA-based uplink (UL) transmission. In addition, each of the plurality of base stations 110-1, 110-2, 110-3, 120-1, and 120-2 may support a multi-input multi-output (MIMO) transmission (e.g., single-user MIMO (SU-MIMO), multi-user MIMO (MU-MIMO), massive MIMO, or the like), a coordinated multipoint (CoMP) transmission, a carrier aggregation (CA) transmission, a transmission in unlicensed band, a device-to-device (D2D) communication (or, proximity services (ProSe)), an Internet of Things (IoT) communication, a dual connectivity (DC), or the like. Here, each of the plurality of terminals 130-1, 130-2, 130-3, 130-4, 130-5, and 130-6 may perform operations corresponding to the operations of the plurality of base stations 110-1, 110-2, 110-3, 120-1, and 120-2 (i.e., the operations supported by the plurality of base stations 110-1, 110-2, 110-3, 120-1, and 120-2).

For example, the second base station 110-2 may transmit a signal to the fourth terminal 130-4 in the SU-MIMO manner, and the fourth terminal 130-4 may receive the signal from the second base station 110-2 in the SU-MIMO manner. Alternatively, the second base station 110-2 may transmit a signal to the fourth terminal 130-4 and fifth terminal 130-5 in the MU-MIMO manner, and the fourth terminal 130-4 and fifth terminal 130-5 may receive the signal from the second base station 110-2 in the MU-MIMO manner. Each of the first base station 110-1, the second base station 110-2, and the third base station 110-3 may transmit a signal to the fourth terminal 130-4 in the CoMP transmission manner, and the fourth terminal 130-4 may receive the signal from the first base station 110-1, the second base station 110-2, and the third base station 110-3 in the CoMP manner. Also, each of the plurality of base stations 110-1, 110-2, 110-3, 120-1, and 120-2 may exchange signals with the corresponding terminals 130-1, 130-2, 130-3, 130-4, 130-5, or 130-6 which belongs to its cell coverage in the CA manner. Each of the base stations 110-1, 110-2, and 110-3 may control D2D communications between the fourth terminal 130-4 and the fifth terminal 130-5, and thus the fourth terminal 130-4 and the fifth terminal 130-5 may perform the D2D communications under control of the second base station 110-2 and the third base station 110-3.

Meanwhile, the communication system may use a function of transmitting data adaptively according to a channel environment between a terminal and a base station in order to enhance transmission performances, such as a data transmission rate and an error probability. For example, the 5G communication system may use an adaptive modulation and coding (AMC) scheme for adaptively determining a modulation order and a channel coding rate of data based on channel state information (CSI) between a specific terminal and a base station. For example, in downlink, a terminal may derive CSI between a base station and the terminal by using a reference signal (RS) received from the base station.

Here, the CSI may include a precoding matrix indicator (PMI), a rank indicator (RI), and/or a channel quality indicator (CQI). For example, the PMI and RI may indicate CSI related to multiple-input multiple-output (MIMO) transmission, and the CQI may indicate a modulation scheme, coding rate, and spectral efficiency that can be used according to a channel condition of the terminal. According to an example, the CSI may be generated by measuring a reference signal received from the base station by the terminal.

According to an example, the terminal may feedback a CQI index corresponding to a high spectral efficiency to the base station when the channel condition is good, and may feedback a CQI index corresponding to a low spectral efficiency to the base station when the channel condition is bad. Accordingly, the base station may determine an MCS level to be used for downlink based on the CSI received from the terminal, and may transmit downlink control information (DCI) including the determined MCS level to the terminal. The terminal may receive data by using the MCS level included in the DCI received from the base station.

A channel state reporting operation performed by the terminal may be performed as follows. The base station may transmit configuration information of a channel state information-reference signal (CSI-RS), and may transmit the CSI-RS based on the configuration information of the CSI-RS. The terminal may receive the configuration information of the CSI-RS from the base station, and may perform a CSI-RS measurement operation based on the configuration information of the CSI-RS. The terminal may determine a CQI index within a CQI table based on a measurement result of the CSI-RS, and may transmit CSI including the CQI index to the base station. The CSI may be transmitted on a physical uplink control channel (PUCCH) and/or a physical uplink shared channel (PUSCH).

The CQI tables may be configured as shown in Tables 1 to 3 below. The CQI table defined in Table 1 may be referred to as CQI table 1, the CQI table defined in Table 2 may be referred to as CQI table 2, and the CQI table defined in Table 3 may be referred to as CQI table 3. The CQI table(s) may be preconfigure in the technical specification. Alternatively, the CQI table(s) may be configured by the base station. For example, the base station may transmit configuration information of the CQI table(s) to the terminal. The terminal may determine one CQI table to be used for CSI reporting (e.g., CQI index reporting) from among the CQI tables according to the technical specification. Alternatively, the terminal may determine one CQI table to be used for CSI reporting (e.g., CQI index reporting) from among the CQI tables according to configuration of the base station. For example, the base station may transmit information indicating the CQI table to be used for CSI reporting to the terminal.

TABLE 1

| CQI index | modulation | code rate × 1024 | efficiency |
|---|---|---|---|
| 0 | | out of range | |
| 1 | QPSK | 78 | 0.1523 |
| 2 | QPSK | 120 | 0.2344 |
| 3 | QPSK | 193 | 0.3770 |
| 4 | QPSK | 308 | 0.6016 |
| 5 | QPSK | 449 | 0.8770 |
| 6 | QPSK | 602 | 1.1758 |
| 7 | 16QAM | 378 | 1.4766 |
| 8 | 16QAM | 490 | 1.9141 |
| 9 | 16QAM | 616 | 2.4063 |
| 10 | 64QAM | 466 | 2.7305 |
| 11 | 64QAM | 567 | 3.3223 |
| 12 | 64QAM | 666 | 3.9023 |
| 13 | 64QAM | 772 | 4.5234 |
| 14 | 64QAM | 873 | 5.1152 |
| 15 | 64QAM | 948 | 5.5547 |

TABLE 2

| CQI index | modulation | code rate × 1024 | efficiency |
|---|---|---|---|
| 0 | | out of range | |
| 1 | QPSK | 78 | 0.1523 |
| 2 | QPSK | 193 | 0.3770 |
| 3 | QPSK | 449 | 0.8770 |
| 4 | 16QAM | 378 | 1.4766 |
| 5 | 16QAM | 490 | 1.9141 |
| 6 | 16QAM | 616 | 2.4063 |
| 7 | 64QAM | 466 | 2.7305 |
| 8 | 64QAM | 567 | 3.3223 |
| 9 | 64QAM | 666 | 3.9023 |
| 10 | 64QAM | 772 | 4.5234 |
| 11 | 64QAM | 873 | 5.1152 |
| 12 | 256QAM | 711 | 5.5547 |
| 13 | 256QAM | 797 | 6.2266 |
| 14 | 256QAM | 885 | 6.9141 |
| 15 | 256QAM | 948 | 7.4063 |

TABLE 3

| CQI index | modulation | code rate × 1024 | efficiency |
|---|---|---|---|
| 0 | | out of range | |
| 1 | QPSK | 30 | 0.0586 |
| 2 | QPSK | 50 | 0.0977 |
| 3 | QPSK | 78 | 0.1523 |
| 4 | QPSK | 120 | 0.2344 |
| 5 | QPSK | 193 | 0.3770 |
| 6 | QPSK | 308 | 0.6016 |
| 7 | QPSK | 449 | 0.8770 |
| 8 | QPSK | 602 | 1.1758 |
| 9 | 16QAM | 378 | 1.4766 |
| 10 | 16QAM | 490 | 1.9141 |
| 11 | 16QAM | 616 | 2.4063 |
| 12 | 64QAM | 466 | 2.7305 |
| 13 | 64QAM | 567 | 3.3223 |
| 14 | 64QAM | 666 | 3.9023 |
| 15 | 64QAM | 772 | 4.5234 |

On the other hand, the base station may receive the CSI from the terminal and may identify the CQI index included in the CSI. The base station may determine an MCS (e.g., MCS index, MCS level) based on the CQI index for transmission of data (e.g., physical downlink shared channel (PDSCH)). The base station may determine the MCS within an MCS table. The MCS tables may be configured as shown in Tables 4 to 6 below. The MCS table defined in Table 4 may be referred to as MCS table 1, the MCS table defined in Table 5 may be referred to as MCS table 2, and the MCS table defined in Table 6 may be referred to as MCS table 3. The MCS table(s) may be predefined in the technical specification. Alternatively, the MCS table(s) may be configured by the base station. For example, the base station may transmit configuration information of the MCS table(s) to the terminal.

The base station may select one MCS table from among the MCS tables (e.g., MCS tables defined in Tables 4 to 6), and may select an MCS within the selected MCS table. The base station may select one MCS table among the MCS tables based on a DCI format and/or a type of a search space. For example, if a PDSCH is scheduled by a DCI format 1_1 having a cyclic redundancy check (CRC) scrambled by a cell radio network temporary identifier (C-RNTI), the base station may select the MCS table 2 defined in Table 5, may select an MCS within the MCS table 2, and may transmit a DCI format 1_1 including the selected MCS. For another example, if a DCI is transmitted through a UE-specific search space, the base station may select the MCS table 3 defined in Table 6, may select an MCS within the MCS table 3, and may transmit a DCI format including the selected MCS.

TABLE 4

| MCS Index $I_{MCS}$ | Modulation Order $Q_m$ | Target code Rate R × [1024] | Spectral efficiency |
|---|---|---|---|
| 0 | 2 | 120 | 0.2344 |
| 1 | 2 | 157 | 0.3066 |
| 2 | 2 | 193 | 0.3770 |
| 3 | 2 | 251 | 0.4902 |
| 4 | 2 | 308 | 0.6016 |
| 5 | 2 | 379 | 0.7402 |
| 6 | 2 | 449 | 0.8770 |
| 7 | 2 | 526 | 1.0273 |
| 8 | 2 | 602 | 1.1758 |
| 9 | 2 | 679 | 1.3262 |
| 10 | 4 | 340 | 1.3281 |
| 11 | 4 | 378 | 1.4766 |
| 12 | 4 | 434 | 1.6953 |

TABLE 4-continued

| MCS Index $I_{MCS}$ | Modulation Order $Q_m$ | Target code Rate R × [1024] | Spectral efficiency |
|---|---|---|---|
| 13 | 4 | 490 | 1.9141 |
| 14 | 4 | 553 | 2.1602 |
| 15 | 4 | 616 | 2.4063 |
| 16 | 4 | 658 | 2.5703 |
| 17 | 6 | 438 | 2.5664 |
| 18 | 6 | 466 | 2.7305 |
| 19 | 6 | 517 | 3.0293 |
| 20 | 6 | 567 | 3.3223 |
| 21 | 6 | 616 | 3.6094 |
| 22 | 6 | 666 | 3.9023 |
| 23 | 6 | 719 | 4.2129 |
| 24 | 6 | 772 | 4.5234 |
| 25 | 6 | 822 | 4.8164 |
| 26 | 6 | 873 | 5.1152 |
| 27 | 6 | 910 | 5.3320 |
| 28 | 6 | 948 | 5.5547 |
| 29 | 2 | reserved | |
| 30 | 4 | reserved | |
| 31 | 6 | reserved | |

TABLE 5

| MCS Index $I_{MCS}$ | Modulation Order $Q_m$ | Target code Rate R × [1024] | Spectral efficiency |
|---|---|---|---|
| 0 | 2 | 120 | 0.2344 |
| 1 | 2 | 193 | 0.3770 |
| 2 | 2 | 308 | 0.6016 |
| 3 | 2 | 449 | 0.8770 |
| 4 | 2 | 602 | 1.1758 |
| 5 | 4 | 378 | 1.4766 |
| 6 | 4 | 434 | 1.6953 |
| 7 | 4 | 490 | 1.9141 |
| 8 | 4 | 553 | 2.1602 |
| 9 | 4 | 616 | 2.4063 |
| 10 | 4 | 658 | 2.5703 |
| 11 | 6 | 466 | 2.7305 |
| 12 | 6 | 517 | 3.0293 |
| 13 | 6 | 567 | 3.3223 |
| 14 | 6 | 616 | 3.6094 |
| 15 | 6 | 666 | 3.9023 |
| 16 | 6 | 719 | 4.2129 |
| 17 | 6 | 772 | 4.5234 |
| 18 | 6 | 822 | 4.8164 |
| 19 | 6 | 873 | 5.1152 |
| 20 | 8 | 682.5 | 5.3320 |
| 21 | 8 | 711 | 5.5547 |
| 22 | 8 | 754 | 5.8906 |
| 23 | 8 | 797 | 6.2266 |
| 24 | 8 | 841 | 6.5703 |
| 25 | 8 | 885 | 6.9141 |
| 26 | 8 | 916.5 | 7.1602 |
| 27 | 8 | 948 | 7.4063 |
| 28 | 2 | reserved | |
| 29 | 4 | reserved | |
| 30 | 6 | reserved | |
| 31 | 8 | reserved | |

TABLE 6

| MCS Index $I_{MCS}$ | Modulation Order $Q_m$ | Target code Rate R × [1024] | Spectral efficiency |
|---|---|---|---|
| 0 | 2 | 30 | 0.0586 |
| 1 | 2 | 40 | 0.0781 |
| 2 | 2 | 50 | 0.0977 |
| 3 | 2 | 64 | 0.1250 |
| 4 | 2 | 78 | 0.1523 |
| 5 | 2 | 99 | 0.1934 |
| 6 | 2 | 120 | 0.2344 |
| 7 | 2 | 157 | 0.3066 |
| 8 | 2 | 193 | 0.3770 |

TABLE 6-continued

| MCS Index $I_{MCS}$ | Modulation Order $Q_m$ | Target code Rate R × [1024] | Spectral efficiency |
|---|---|---|---|
| 9 | 2 | 251 | 0.4902 |
| 10 | 2 | 308 | 0.6016 |
| 11 | 2 | 379 | 0.7402 |
| 12 | 2 | 449 | 0.8770 |
| 13 | 2 | 526 | 1.0273 |
| 14 | 2 | 602 | 1.1758 |
| 15 | 4 | 340 | 1.3281 |
| 16 | 4 | 378 | 1.4766 |
| 17 | 4 | 434 | 1.6953 |
| 18 | 4 | 490 | 1.9141 |
| 19 | 4 | 553 | 2.1602 |
| 20 | 4 | 616 | 2.4063 |
| 21 | 6 | 438 | 2.5664 |
| 22 | 6 | 466 | 2.7305 |
| 23 | 6 | 517 | 3.0293 |
| 24 | 6 | 567 | 3.3223 |
| 25 | 6 | 616 | 3.6094 |
| 26 | 6 | 666 | 3.9023 |
| 27 | 6 | 719 | 4.2129 |
| 28 | 6 | 772 | 4.5234 |
| 29 | 2 | reserved | |
| 30 | 4 | reserved | |
| 31 | 6 | reserved | |

In such the 5G communication system, the CSI feedback and AMC scheme may significantly degrade the transmission performance in an environment in which a CSI aging occurs. Here, the environment in which the CSI aging occurs may be an environment in which the channel state between the terminal and the base station used for CSI estimation and AMC level determination for transmission of data is different from the channel state when the data is actually transmitted. For example, in a satellite communication system having a very large transmission delay, the CSI feedback and AMC scheme may significantly degrade the system performance due to the CSI aging. In addition, a CSI aging may occur even in an environment where a terminal or a base station moves fast.

Accordingly, the communication system may feedback CSI (e.g., CQI) capable of supporting MCS levels having various granularities in the environment in which the CSI aging may occur, thereby reducing a performance degradation due to the CSI aging. To this end, the communication system may need a method of configuring CQI tables to be used for CQI feedback, a method of designating a specific CQI table to be used for CQI feedback at a specific time point, and the like. Here, the communication system may configure the CQI tables based on a relationship between CQI and MCS. Alternatively, the communication system may configure the CQI tables by reflecting channel characteristics to be used regardless of the relationship between CQI and MCS.

FIG. 3 is a conceptual diagram illustrating relationship between all CQI information and all MCS levels.

Referring to FIG. 3, all CQI information may be arranged to be grouped for each modulation scheme by integrating Tables 1 to 3, and may be arranged according to an increasing order of coding rates. In all of the CQI information, a spectral efficiency in case of (modulation scheme=64QAM, coding rate×1024=948) may be the same as a spectral efficiency in case of (modulation scheme=256QAM, coding rate×1024=711). On the other hand, all MCS levels may be arranged to be grouped for each modulation scheme by integrating Tables 4 to 6, and may be arranged according to an increasing order of coding rates. Here, the first CQI in the CQI table may correspond to the first MCS in the MCS table, the second CQI in the CQI table may correspond to the third MCS in the MCS table, and the third CQI in the CQI table may corresponding to the fifth CQI in the MCS table. As such, the n-th CQI in the CQI table may correspond to the (2n+1)-th MCS in the MCS table. Here, n may be a positive integer. As such, there may be a problem in that the CQI table does not indicate all spectral efficiencies indicated by the MCS table. The MCS table is more granular than the CQI table, so it can be said that the granularity thereof is higher.

FIG. 4 is a conceptual diagram illustrating a gap between spectral efficiencies of all MCS levels.

Referring to FIG. 4, a gap between spectral efficiencies of MCS levels may be similar to each other in units of two adjacent levels. For example, in all MCS levels, the spectral efficiency of the first MCS level may be 0.0586, and the spectral efficiency of the second MCS level may be 0.0781. Accordingly, a gap between the spectral efficiency of the first MCS level and the spectral efficiency of the second MCS level may be 0.0195. In addition, the spectral efficiency of the third MCS level among all MCS levels may be 0.0977. Accordingly, a gap between the spectral efficiency of the second MCS level and the spectral efficiency of the third MCS level may be 0.0196. As such, in all MCS levels, a gap between the spectral efficiencies of the first and second MCS levels and a gap between the spectral efficiencies of the second and third MCS levels may be similar. As such, a gap between spectral efficiencies of MCS levels may be similar to each other in units of two adjacent levels.

Figure 5:
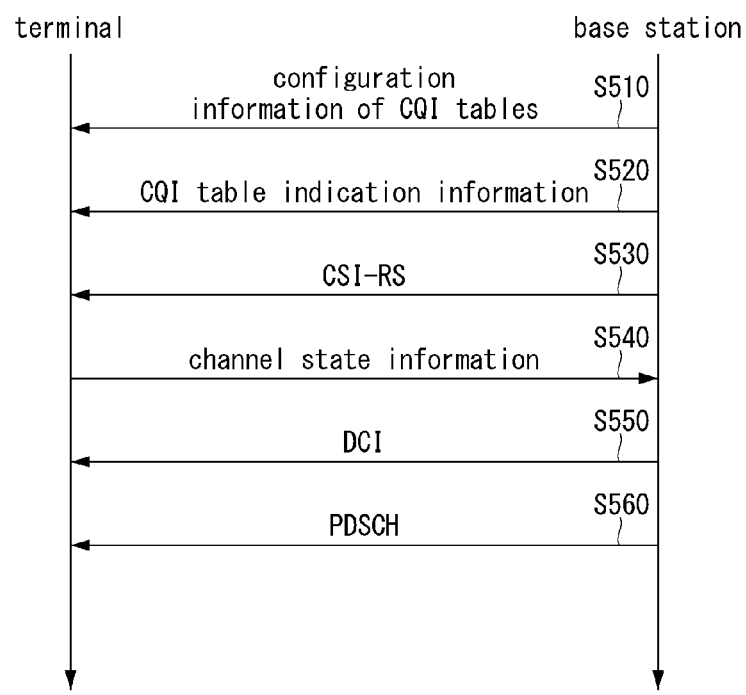
FIG. 5 is a sequence chart according to a first exemplary embodiment of a method for channel state information feedback in a communication system.

FIG. 5 is a sequence chart according to a first exemplary embodiment of a method for channel state information feedback in a communication system.

Referring to FIG. 5, in a channel state information feedback method, the base station may transmit configuration information of CQI tables to the terminal (S510). Accordingly, the terminal may receive the configuration information of CQI tables from the base station. Here, the base station may be configured to transmit the configuration information of CQI tables to the terminal, but unlike this, the configuration information of CQI tables may be preconfigured to the terminal. Meanwhile, the base station may transmit CQI table indication information indicating a table usable by the terminal among the CQI tables to the terminal (S520). Accordingly, the terminal may receive the CQI table indication information from the base station. The CQI table indication information may include information indicating one CQI table to be used for CSI feedback among the CQI tables. In addition, the CQI table indication information may further include information indicating a valid time interval of the CQI table indicated by the corresponding CQI table indication information. The terminal may use the CQI table (e.g., the CQI table indicated by the base station or the CQI table selected by the terminal) within the valid time interval indicated by the base station. The terminal may not use the corresponding CQI table outside the valid time interval. As an example, the valid time interval may be set to 10 ms, and the valid time interval may start from a timing of receiving (or, transmitting) the CQI table indication information. Such the valid time interval may be notified by the base station to the terminal through the CQI table indication information, but may be preconfigured to the terminal.

Then, the base station may transmit a CSI-RS to the terminal (S530). Then, the terminal may receive the CSI-RS from the base station. The terminal may derive CSI between the base station and the terminal by using the CSI-RS received from the base station. Then, the terminal may feedback the CSI to the base station (S540). Here, the CSI may include a precoding matrix indicator (PMI), a rank indicator (RI), and/or a channel quality indicator (CQI) index. In this case, the terminal may select a CQI table according to the CQI table indication information among the CQI tables. Alternatively, the terminal may select the CQI table among the CQI tables according to a preset criterion. The preset criterion may be predefined in the technical specification. Alternatively, the preset criterion may be configured by the base station. The terminal may feedback a CQI index corresponding to a high spectral efficiency to the base station when a channel condition is good, and may feedback a CQI index corresponding to a low spectral efficiency to the base station when the channel condition is bad.

Accordingly, the base station may receive the CSI from the terminal, and may determine an MCS level to be used for downlink based on the received CSI. Then, the base station may deliver the determined MCS level to the terminal by using a DCI (S550). Accordingly, the terminal may receive the DCI from the base station, and may identify the MCS level included in the DCI. Thereafter, the base station may transmit data to the terminal on a PDSCH using the determined MCS (S560). Then, the terminal may receive the data by using the MCS level indicated by the base station.

Meanwhile, the above-described CQI tables may be configured as follows. For example, specific spectral efficiencies in the CQI tables may be the same.

FIG. 6 is a conceptual diagram illustrating a first exemplary embodiment of a method for configuring CQI tables having overlapping section(s).

Referring to FIG. 6, three CQI tables (e.g., CQI table 1, CQI table 2, and CQI table 3) may be configured. The CQI tables may be configured by the base station or may be predefined in the technical specification. The spectral efficiencies indicated by the CQI indexes 13, 14, and 15 of the CQI table 1 may be the same as the spectral efficiencies indicated by the CQI indexes 1, 2, and 3 of the CQI table 2. In addition, the spectral efficiencies indicated by the CQI indexes 13, 14, and 15 of the CQI table 2 may be the same as the spectral efficiencies indicated by CQI indexes 1, 2, and 3 of the CQI table 3. As such, the spectral efficiencies indicated by the high-order CQI indexes of the CQI table 1 may be the same as the spectral efficiencies indicated by the low-order CQI indexes of the CQI table 2. In addition, the spectral efficiencies indicated by the high-order CQI indexes of the CQI table 2 may be the same as the spectral efficiencies indicated by the low-order CQI indexes of the CQI table 3. In this case, the overlapping section of the CQI table may consist of spectral efficiencies indicated by three CQI indexes, so that relatively fewer spectral efficiencies may belong to the overlapping section as compared to the total spectral efficiencies indicated by all 16 CQI indexes. The CQI index 0 in each of the CQI tables may indicate that use of a CQI (e.g., CQI table) indicating a spectral efficiency out of a range of spectral efficiencies indicated by the corresponding CQI table is required.

FIG. 7 is a conceptual diagram illustrating a second exemplary embodiment of a method for configuring CQI tables having overlapping section(s).

Referring to FIG. 7, four CQI tables (e.g., CQI table 1, CQI table 2, CQI table 3, and CQI table 4) may be configured. The CQI tables may be configured by the base station or may be predefined in the technical specification. The spectral efficiencies indicated by the CQI indexes 9, 10, 11, 12, 13, 14, and 15 of the CQI table 1 may be the same as the spectral efficiencies indicated by the CQI indexes 1, 2, 3, 4, 5, 6 and 7 of the CQI table 2. In addition, the spectral efficiencies indicated by the CQI indexes 9, 10, 11, 12, 13, 14 and 15 of the CQI table 2 may be the same as the spectral efficiencies indicated by the CQI indexes 1, 2, 3, 4, 5, 6 and 7 of the CQI table 3. In addition, the spectral efficiencies indicated by the CQI indexes 9, 10, 11, 12, 13, 14 and 15 of the CQI table 3 may be the same as the spectral efficiencies indicated by the CQI indexes 1, 2, 3, 4, 5, 6 and 7 of the CQI table 4.

As such, the spectral efficiencies indicated by the high-order CQI indexes of the CQI table 1 may be the same as the spectral efficiencies indicated by the low-order CQI indexes of the CQI table 2. In addition, the spectral efficiencies indicated by the high-order CQI indexes of the CQI table 2 may be the same as the spectral efficiencies indicated by the low-order CQI indexes of the CQI table 3. In addition, the spectral efficiencies indicated by the high-order CQI indexes of the CQI table 3 may be the same as the spectral efficiencies indicated by the low-order CQI indexes of the CQI table 4. In this case, the overlapping section of the CQI table may consist of spectral efficiencies indicated by seven CQI indices, so that relatively more spectral efficiencies may belong to the overlapping section as compared to the case of FIG. 6, in consideration of the total spectral efficiencies indicated by all 16 CQI indexes. The CQI index 0 in each of the CQI tables may indicate that use of a CQI (e.g., CQI table) indicating a spectral efficiency out of a range of spectral efficiencies indicated by the corresponding CQI table is required.

Figure 8:
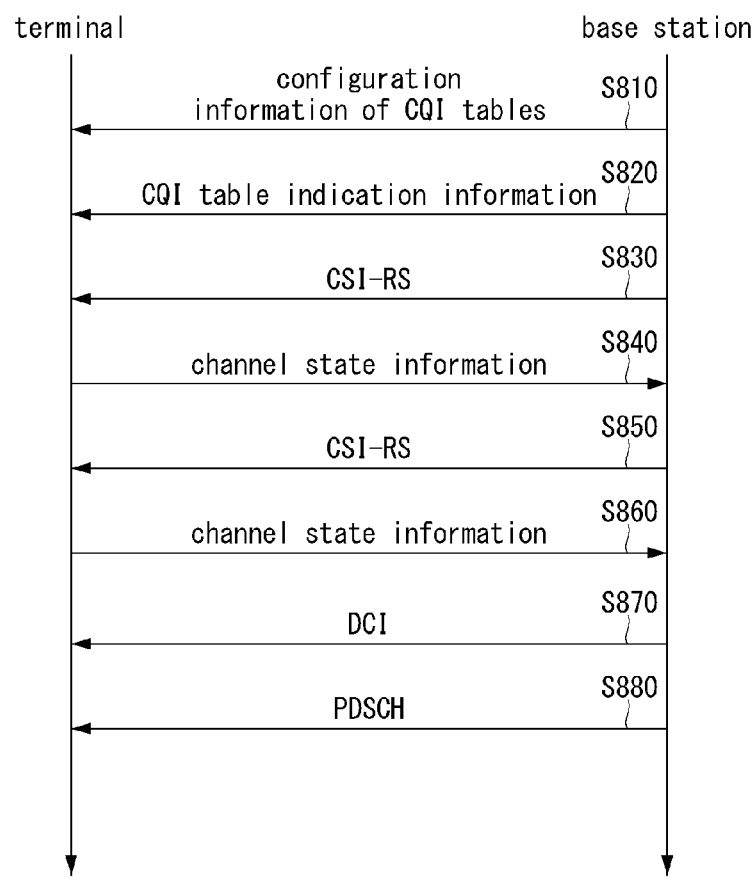
FIG. 8 is a sequence chart according to a second exemplary embodiment of a method for channel state information feedback in a communication system.

FIG. 8 is a sequence chart according to a second exemplary embodiment of a method for channel state information feedback in a communication system.

Referring to FIG. 8, in a channel state information feedback method, the base station may transmit configuration information of CQI tables to the terminal (S810). Accordingly, the terminal may receive the configuration information of CQI tables from the base station. Here, the base station may be configured to transmit the configuration information of CQI tables to the terminal, but unlike this, the configuration information of CQI tables may be preconfigured to the terminal. Meanwhile, the base station may transmit CQI table indication information indicating a table usable by the terminal among the CQI tables to the terminal (S820). Accordingly, the terminal may receive the CQI table indication information from the base station. The CQI table indication information may include information indicating one CQI table to be used for CSI feedback among the CQI tables. In addition, the CQI table indication information may further include information indicating a valid time interval of the CQI table indicated by the corresponding CQI table indication information. The terminal may use the CQI table (e.g., the CQI table indicated by the base station or the CQI table selected by the terminal) within the valid time interval indicated by the base station. The terminal may not use the corresponding CQI table outside the valid time interval. As an example, the valid time interval may be set to 10 ms, and the valid time interval may start from a timing of receiving (or, transmitting) the CQI table indication information. Such the valid time interval may be notified by the base station to the terminal through the CQI table indication information, but may be preconfigured to the terminal.

Then, the base station may transmit a CSI-RS to the terminal (S830). Then, the terminal may receive the CSI-RS from the base station. The terminal may derive CSI between the base station and the terminal by using the CSI-RS received from the base station. Then, the terminal may feedback the CSI to the base station (S840). Here, the CSI may include a PMI, an RI, and/or a CQI index. In this case, the terminal may select the CQI table according to the CQI table indication information among the CQI tables. Alternatively, the terminal may select the CQI table among the CQI tables according to a preset criterion. The preset criterion may be predefined in the technical specification. Alternatively, the preset criterion may be configured by the base station. The terminal may feedback a CQI index corresponding to a high spectral efficiency to the base station when a channel condition is good, and may feedback a CQI index corresponding to a low spectral efficiency to the base station when the channel condition is bad.

Accordingly, the base station may receive the CSI from the terminal, and may determine an MCS level to be used for downlink based on the received CSI. Then, the base station may deliver the determined MCS level to the terminal using a DCI. Accordingly, the terminal may receive the DCI from the base station, and may identify the MCS level included in the DCI. Thereafter, the base station may transmit data to the terminal on a PDSCH by using the determined MCS. Then, the terminal may receive the data by using the MCS level indicated by the base station.

On the other hand, if the terminal receives the CSI-RS, and selects a CQI index belonging to the overlapping section in the indicated CQI table, the terminal may change the CQI table to be used later according to the position of the selected CQI index. To this end, the base station may allow the CQI table indication information to include triggering information for changing the CQI table. For example, the triggering information set to 0 may indicate that the CQI table is to be changed later by the terminal, and the triggering information set to 1 may indicate that the CQI table is not to be changed later. If the triggering information is set to 0, and the terminal selects the CQI index of the overlapping section, the terminal may change the CQI table, select a CQI index within the changed CQI table, and report the selected CQI index to the base station. In this case, the selected CQI index and CQI table change information may be reported together to the base station. On the other hand, if the triggering information is set to 1 and the terminal selects the CQI index of the overlapping section, the terminal may not change the CQI table, select a CQI index in the existing CQI table, and report the selected CQI index to the base station.

On the other hand, if the terminal selects a low CQI index of the overlapping section of the CQI tables of FIGS. 6 and 7, the terminal may change the CQI table to be used later to a lower CQI table having the same spectral efficiency as the spectral efficiency indicated by the low CQI index. As an example, if the terminal selects the CQI index 2 from the CQI table 2 of FIGS. 6 and 7, the terminal may change the CQI table to be used later to the CQI table 1 having the same spectral efficiency as the spectral efficiency indicated by the CQI index 2. Similarly, if the terminal selects a high CQI index in the overlapping section of the CQI tables of FIGS. 6 and 7, the terminal may change the CQI table to be used later to a higher CQI table having the same spectral efficiency as the spectral efficiency indicated by the high CQI index. For example, if the terminal selects the CQI index 14 from the CQI table 2 of FIGS. 6 and 7, the terminal may change the CQI table to be used later to the CQI table 3 having the same spectral efficiency as the spectral efficiency indicated by the CQI index 14.

In this regard, upon receiving the CQI index through the CSI, the base station may determine whether the received CQI index belong to the overlapping section. As a result of the determination, the base station may recognize that the received CQI index is located in the overlapping section, and may recognize a CQI index included in a subsequently received CSI is a CQI index located in a changed CQI table. In this case, the triggering information for the change of the CQI table transmitted by the base station to the terminal through the CQI table indication information may be set to 0. As an example, when the CQI index received by the base station is a low CQI index of the overlapping section of the CQI tables of FIGS. 6 and 7, the base station may determine that a CQI table to be used later by the terminal is changed to a lower CQI table having the same spectral efficiency as the spectral efficiency indicated by the low CQI index. As an example, when the received CQI index is the CQI index 2 of the CQI table 2 of FIGS. 6 and 7, the base station may determine that a CQI table to be used later by the terminal is changed to the CQI table 1 having the same spectral efficiency as the spectral efficiency indicated by the CQI index 2. Similarly, when the received CQI index is a high CQI index of the overlapping section of the CQI tables of FIGS. 6 and 7, the base station may determine that a CQI table to be used later by the terminal is changed to a higher CQI table having the same spectral efficiency as the spectral efficiency indicated by the high CQI index. As an example, when the received CQI index is the CQI index 14 of the CQI table 2 of FIGS. 6 and 7, the base station may determine that a CQI table to be used later by the terminal is changed to the CQI table 3 having the same spectral efficiency as the spectral efficiency indicated by the CQI index 14.

Then, the base station may transmit a CSI-RS to the terminal (S850). Then, the terminal may receive the CSI-RS from the base station. The terminal may derive CSI between the base station and the terminal by using the CSI-RS received from the base station. Then, the terminal may feedback the CSI to the base station (S860). In this case, the terminal may not select a CQI index from the CQI table according to the CQI table indication information, but if the channel condition is good, the terminal may feedback a CQI index corresponding to a high spectral efficiency within the CQI table changed to be used later. On the other hand, if the channel situation is bad, the terminal may feedback a CQI index corresponding to a low spectral efficiency within the CQI table changed to be used later. Accordingly, the base station may receive the CSI from the terminal, and may determine an MCS level to be used for downlink based on the received CSI. In this case, the base station may also know that the CQI table used by the terminal is changed, and thus may determine the MCS level to be used for downlink with reference to the changed CQI table. Then, the base station may deliver the determined MCS level to the terminal using a DCI (S870). Accordingly, the terminal may receive the DCI from the base station, and may identify the MCS level included in the DCI. Thereafter, the base station may transmit data to the terminal on a PDSCH by using the determined MCS (S880). Then, the terminal may receive the data by using the MCS level indicated by the base station.

Figure 9:
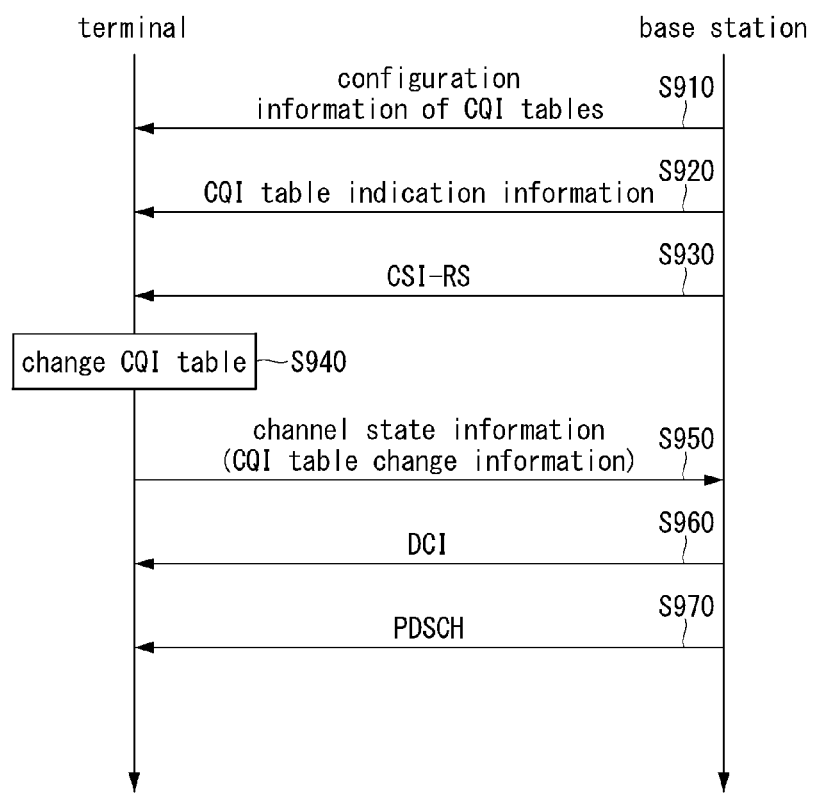
FIG. 9 is a sequence chart according to a third exemplary embodiment of a method for channel state information feedback in a communication system.

FIG. 9 is a sequence chart according to a third exemplary embodiment of a method for channel state information feedback in a communication system.

Referring to FIG. 9, in a channel state information feedback method, the base station may transmit configuration information of CQI tables to the terminal (S910). Accordingly, the terminal may receive the configuration information of CQI tables from the base station. Here, the base station may be configured to transmit the configuration information of CQI tables to the terminal, but unlike this, the configuration information of CQI tables may be preconfigured to the terminal. Meanwhile, the CQI tables according to the configuration information transmitted from the base station to the terminal may have CQI indexes corresponding to the same spectral efficiencies in some sections. In addition, each of the CQI tables may include a CQI index value including CQI table change information that allows a CQI index to be selected from another CQI table, when a desired MCS is out of a range of the corresponding CQI table and thus an appropriate MCS cannot be selected from the corresponding CQI table.

FIG. 10 is a conceptual diagram illustrating a first exemplary embodiment of a method for configuring CQI tables having overlapping sections, each of which includes CQI table change information.

Referring to FIG. 10, three CQI tables (e.g., CQI table 1, CQI table 2, and CQI table 3) may be configured. The CQI tables may be configured by the base station or may be predefined in the technical specification. The spectral efficiencies indicated by the CQI indexes 13 and 14 of the CQI table 1 may be the same as the spectral efficiencies indicated by the CQI indexes 1 and 2 of the CQI table 2. In addition, the spectral efficiency indicated by the CQI index 14 of the CQI table 2 may be the same as the spectral efficiency indicated by the CQI index 1 of the CQI table 3. As such, the spectral efficiencies indicated by the high-order CQI indexes of the CQI table 1 may be the same as the spectral efficiencies indicated by the low-order CQI indexes of the CQI table 2. In addition, the spectral efficiencies indicated by the high-order CQI indexes of the CQI table 2 may be the same as the spectral efficiencies indicated by the low-order CQI indexes of the CQI table 3. In this case, the overlapping section of the CQI table may consist of spectral efficiency(s) indicated by one or two CQI indexes, so that relatively fewer spectral efficiency(s) may be arranged in the overlapping section, as compared to the total spectral efficiencies indicated by all 16 CQI indexes.

In each of the CQI tables, the CQI indexes 0 and 15 may indicate that use of a CQI (e.g., CQI table) indicating a spectral efficiency out of a range of spectral efficiencies indicated by the corresponding CQI table is required. In this case, the CQI index 0 may request use of a lower level CQI table than the current CQI table. For example, if the CQI table 2 is currently used, the CQI index 0 may request use of the CQI table 1. In addition, the CQI index 15 may request use of a higher level CQI table than the current CQI table. For example, when the CQI table 2 is currently used, the CQI index 15 may request use of the CQI table 3.

FIG. 11 is a conceptual diagram illustrating a second exemplary embodiment of a method for configuring CQI tables having overlapping sections, each of which includes CQI table change information.

Referring to FIG. 11, four CQI tables (e.g., CQI table 1, CQI table 2, CQI table 3, and CQI table 4) may be configured. The CQI tables may be configured by the base station or may be predefined in the technical specification. The spectral efficiencies indicated by the CQI indexes 9, 10, 11, 12, 13, and 14 of the CQI table 1 may be the same as the spectral efficiencies indicated by the CQI indexes 1, 2, 3, 4, 5, and 6 of the CQI table 2. In addition, the spectral efficiencies indicated by the CQI indexes 9, 10, 11, 12, 13, and 14 of the CQI table 2 may be the same as the spectral efficiencies indicated by CQI indexes 1, 2, 3, 4, 5, and 6 of the CQI table 3. In addition, the spectral efficiencies indicated by CQI indexes 10, 11, 12, 13 and 14 of the CQI table 3 may be the same as the spectral efficiencies indicated by the CQI indexes 1, 2, 3, 4, and 5 of the CQI table 4.

As such, the spectral efficiencies indicated by the high-order CQI indexes of the CQI table 1 may be the same as the spectral efficiencies indicated by the low-order CQI indexes of the CQI table 2. In addition, the spectral efficiencies indicated by the high-order CQI indexes of the CQI table 2 may be the same as the spectral efficiencies indicated by the low-order CQI indexes of the CQI table 3. In addition, the spectral efficiencies indicated by the high-order CQI indexes of the CQI table 3 may be the same as the spectral efficiencies indicated by the low-order CQI indexes of the CQI table 4. In this case, the overlapping section of the CQI table may consist of spectral efficiencies indicated by five or seven CQI indices, so that a relatively large number of spectral efficiencies may belong to the overlapping section as compared to the case of FIG. 10, in consideration of the total spectral efficiencies indicated by all 16 CQI indexes.

In each of the CQI tables, the CQI indexes 0 and 15 may indicate that use of a CQI (e.g., CQI table) indicating a spectral efficiency out of a range of spectral efficiencies indicated by the corresponding CQI table is required. In this case, the CQI index 0 may request use of a lower level CQI table than the current CQI table. For example, if the CQI table 2 is currently used, the CQI index 0 may request use of the CQI table 1. In addition, the CQI index 15 may request use of a higher level CQI table than the current CQI table. For example, if the CQI table 2 is currently used, the CQI index 15 may request use of the CQI table 3. Information on the number of the target CQI table indicated by the CQI index 0 or 15 may be informed by the base station to the terminal through the CQI table indication information.

Referring again to FIG. 9, the base station may transmit the CQI table indication information indicating a table usable by the terminal among the CQI tables to the terminal (S920). Accordingly, the terminal may receive the CQI table indication information from the base station. The CQI table indication information may include information indicating a CQI table to be used for CSI feedback among the CQI tables. In addition, the CQI table indication information may further include information indicating a valid time interval of the CQI table indicated by the corresponding CQI table indication information. The terminal may use the CQI table (e.g., the CQI table indicated by the base station or the CQI table selected by the terminal) within the valid time interval indicated by the base station. The terminal may not use the corresponding CQI table outside the valid time interval. As an example, the valid time interval may be set to 10 ms, and the valid time interval may start from a timing of receiving (or, transmitting) the CQI table indication information. Such the valid time interval may be notified by the base station to the terminal through the CQI table indication information, but may be preconfigured to the terminal.

In addition, the CQI table indication information may include triggering information for changing the CQI table. For example, the triggering information set to 0 may indicate that the CQI table is changed by the base station, and the triggering information set to 1 may indicate that the CQI table is changed by the terminal. When the triggering information is set to 0 and the terminal selects the CQI index 0 or 15, the terminal may report the CQI index 0 or 15 to the base station without changing the CQI table. Upon receiving the CQI index 0 or 15 from the terminal, the base station may change the CQI table. When the triggering information is set to 1 and the terminal selects the CQI index 0 or 15, the terminal may change the CQI table, select a CQI index within the changed CQI table, and report the selected CQI index to the base station. In this case, the selected CQI index and information on the changed CQI table may be reported together to the base station.

Then, the base station may transmit a CSI-RS to the terminal (S930). Then, the terminal may receive the CSI-RS from the base station. The terminal may derive CSI between the base station and the terminal by using the CSI-RS received from the base station. Then, the terminal may feedback the CSI to the base station. Here, the CSI may include a PMI, an RI, and/or a CQI index. In this case, the terminal may select the CQI table according to the CQI table indication information among the CQI tables. Alternatively, the terminal may select the CQI table among the CQI tables according to a preset criterion. The preset criterion may be predefined in the technical specification. Alternatively, the preset criterion may be configured by the base station. The terminal may feedback a CQI index corresponding to a high spectral efficiency to the base station when a channel condition is good, and may feedback a CQI index corresponding to a low spectral efficiency to the base station when the channel condition is bad.

In this case, the terminal may select the CQI index 0 from the CQI table according to the CQI table indication information because a channel state is not good. In this case, the terminal may determine whether the triggering information received from the base station is set to 0 or 1. As a result of the determination, if the triggering information is set to 0, the terminal may report the CQI index 0 to the base station through the CSI without changing the CQI table. Accordingly, the base station may receive the CSI in which the CQI index is set to 0. Then, the base station may identify that the CQI index is 0, and may transmit, to the terminal, CQI table indication information instructing the terminal to change a CQI table to be used later to a lower level CQI table and to use the changed lower level CQI table. In this case, the base station may transmit the CQI table indication information instructing to change the CQI table to the lower level CQI table and use the lower level CQI table, instead of transmitting CQI table indication information indicating the changed low level CQI table. Accordingly, the terminal may receive, from the base station, the CQI table indication information instructing to change the CQI table to be used to the lower level CQI table and use the lower level CQI table. Thereafter, the base station may transmit a CSI-RS to the terminal. Then, the terminal may receive the CSI-RS from the base station. The terminal may derive CSI between the base station and the terminal by using the CSI-RS received from the base station. Then, the terminal may feedback the CSI to the base station. In this case, the terminal may select the lower-level CQI table according to the CQI table indication information among the CQI tables.

On the other hand, the terminal may determine whether the triggering information received from the base station is set to 0 or 1. If the triggering information is determined to be 1, this may mean that the CQI table is to be immediately changed, and the terminal may change the CQI table to a lower level CQI table (S940). In addition, the terminal may select a CQI index within the changed CQI table, and may generate CSI using the selected CQI index. Then, the terminal may feedback the CSI to the base station. In this case, the terminal may feedback the CSI including a CQI table down-change indicator, which is CQI table down-change information informing the base station that the CQI table is changed to the lower-level CQI table (S950).

Meanwhile, upon receiving the CSI-RS from the base station in the step S930, the terminal may select the CQI index 15 from the CQI table according to the CQI table indication information because the channel state is good. In this case, the terminal may determine whether the triggering information received from the base station is set to 0 or 1. As a result of the determination, if the triggering information is 0, the terminal may report the CQI index 15 to the base station through the CSI without changing the CQI table.

Accordingly, the base station may receive the CSI in which the CQI index is set to 15. Also, the base station may identify that the CQI index is 15, and may transmit, to the base station, CQI table indication information instructing the terminal to change the CQI table to a higher-level CQI table and use the higher-level CQI table. In this case, the base station may transmit the CQI table indication information instructing to change the CQI table to the higher-level CQI table and use the higher-level CQI table instead of transmitting CQI table indication information indicating the changed higher-level CQI table. Accordingly, the terminal may receive the CQI table indication information instructing to change the CQI table to the higher-level CQI table and use the changed higher-level CQI table. Thereafter, the base station may transmit a CSI-RS to the terminal. Then, the terminal may receive the CSI-RS from the base station. The terminal may derive CSI between the base station and the terminal by using the CSI-RS received from the base station. Then, the terminal may feedback the CSI to the base station. In this case, the terminal may select the high-level CQI table according to the CQI table indication information among the CQI tables.

On the other hand, the terminal may determine whether the triggering information received from the base station is set to 0 or 1. If the triggering information is determined to be 1, this may mean that the CQI table is to be immediately changed, and the terminal may change the CQI table to a higher level CQI table (S940). In addition, the terminal may select a CQI index within the changed CQI table, and may generate CSI using the selected CQI index. Then, the terminal may feedback the CSI to the base station. In this case, the terminal may feedback the CSI including a CQI table up-change indicator, which is CQI table up-change information informing the base station that the CQI table is changed to the higher-level CQI table (S950).

On the other hand, the base station may receive the CSI from the terminal, and may determine an MCS level to be used for downlink based on the received CSI. In this case, when the base station receives the CSI including the CQI table up-change indicator or the CQI table down-change indicator from the terminal, the base station may change the CQI table to the corresponding CQI table and may determine an MCS level to be used for downlink by referring to the changed CQI table. Then, the base station may deliver the determined MCS level to the terminal by using a DCI (S960). Accordingly, the terminal may receive the DCI from the base station and may identify the MCS level included in the DCI. Thereafter, the base station may transmit data to the terminal on a PDSCH by using the determined MCS level (S970). Then, the terminal may receive the data by using the MCS level indicated by the base station.

On the other hand, the CQI tables according to the configuration information of the CQI tables transmitted by the base station to the terminal may be the same in some sections. In the previous description, it has been described that the CQI tables are configured based on the relationship between CQI and MCS in the communication system. Alternatively, new CQI tables may be configured by reflecting channel characteristics to be used regardless of the relationship between CQI and MCS in the communication system. For example, in a satellite communication environment of 6 GHz or above, attenuation of signals may be very large, such as −50 to −30 dB, and thus CQI tables may be configured as shown in FIG. 12 in the communication system.

FIG. 12 is a conceptual diagram illustrating a third exemplary embodiment of a method for configuring CQI tables having overlapping sections, each of which includes CQI table change information.

Referring to FIG. 12, four CQI tables (e.g., CQI table 1, CQI table 2, CQI table 3, and CQI table 4) may be configured. The CQI tables may be configured by the base station or may be predefined in the technical specification. The spectral efficiencies indicated by the CQI indexes 9, 10, 11, 12, 13, and 14 of the CQI table 1 may be the same as the spectral efficiencies indicated by the CQI indexes 1, 2, 3, 4, 5, and 6 of the CQI table 2. In addition, the spectral efficiencies indicated by the CQI indexes 10, 11, 12, 13 and 14 of the CQI table 2 may be the same as the spectral efficiencies indicated by the CQI indexes 2, 3, 4, 5, and 6 of the CQI table 3. In addition, the spectral efficiencies indicated by the CQI indexes 12, 13, and 14 of the CQI table 3 may be the same as the spectral efficiencies indicated by CQI indexes 3, 4, and 5 of the CQI table 4.

As such, the spectral efficiencies indicated by the high-order CQI indexes of the CQI table 1 may be the same as the spectral efficiencies indicated by the low-order CQI indexes of the CQI table 2. In addition, the spectral efficiencies indicated by the high-order CQI indexes of CQI table 2 may be the same as the spectral efficiencies indicated by the low-order CQI indexes of the CQI table 3. In addition, spectral efficiencies indicated by the high-order CQI indexes of the CQI table 3 may be the same as the spectral efficiencies indicated by the low-order CQI indexes of the CQI table 4.

Meanwhile, the CQI index 15 in the CQI table 1 may indicate that use of a CQI (e.g., CQI table) indicating a spectral efficiency out of a range of spectral efficiencies indicated by the corresponding CQI table is required. In this case, the CQI index 15 may request use of a higher-level CQI table than the current CQI table. For example, the CQI index 15 of the current CQI table 1 may request use of the CQI table 2. Similarly, the CQI index 0 or 15 in the CQI table 2 may indicate that use of a CQI (e.g., CQI table) indicating a spectral efficiency out of a range of spectral efficiencies indicated by the corresponding CQI table is required. In this case, the CQI index 0 may request use of a lower level CQI table than the current CQI table. For example, the CQI index 0 of the current CQI table 2 may request use of the CQI table 1. In addition, the CQI index 15 may request use of a higher-level CQI table than the current CQI table. For example, the CQI index 15 of the current CQI table 2 may request use of the CQI table 3.

Meanwhile, the CQI index 0, 1, or 15 in the CQI table 3 may indicate that use of a CQI (e.g., CQI table) indicating a spectral efficiency out of a range of spectral efficiencies indicated by the corresponding CQI table is required. In this case, the CQI index 0 may request use of a lower level CQI table than the current CQI table. For example, the CQI index 0 of the current CQI table 3 may request use of the CQI table 1. In addition, the CQI index 1 of the current CQI table 3 may request use of the CQI table 2. On the other hand, the CQI index 15 may request use of a higher-level CQI table than the current CQI table. For example, the CQI index 15 of the current CQI table 3 may request use of the CQI table 4. On the other hand, the CQI index 0, 1, 2, or 15 in the CQI table 4 may indicate that use of a CQI (e.g., CQI table) indicating a spectral efficiency out of a range of spectral efficiencies indicated by the corresponding CQI table is required. In this case, the CQI index 0 may request use of a lower level CQI table than the current CQI table. For example, the CQI index 0 of the current CQI table 4 may request use of the CQI table 1. In addition, the CQI index 1 of the current CQI table 4 may request use of the CQI table 2. In addition, the CQI index 2 of the current CQI table 4 may request use of the CQI table 3.

The numbers of the target CQI tables indicated by such the CQI indexes may be notified by the base station to the terminal through CQI table indication information. When the CQI tables are configured in the above-described manner, the base station may transmit, to the terminal, the CQI table indication information indicating CQI tables usable by the terminal among the CQI tables. Accordingly, the terminal may receive the CQI table indication information from the base station. The CQI table indication information may include information indicating a CQI table to be used for CSI feedback among the CQI tables. In addition, the CQI table indication information may further include information indicating a valid time interval of the CQI table indicated by the corresponding CQI table indication information. The terminal may use the CQI table (e.g., the CQI table indicated by the base station or the CQI table selected by the terminal) within the valid time interval indicated by the base station. The terminal may not use the corresponding CQI table outside the valid time interval. As an example, the valid time interval may be set to 10 ms, and the valid time interval may start from a timing of receiving (or, transmitting) the CQI table indication information. Such the valid time interval may be notified by the base station to the terminal through the CQI table indication information, but may be preconfigured to the terminal.

In addition, the CQI table indication information may include triggering information for changing the CQI table. For example, the triggering information set to 0 may indicate that the CQI table is changed by the base station, and the triggering information set to 1 may indicate that the CQI table is changed by the terminal. When the triggering information is set to 0, and the terminal selects the CQI index 15 of the CQI table, the CQI index 0 or 15 of the CQI table 2, the CQI index 0, 1, or 15 of the CQI table 3, or the CQI index 0, 1, or 2 of the CQI table 4, the terminal may report the selected CQI index to the base station without changing the CQI table. Upon receiving the corresponding CQI index from the terminal, the base station may change the CQI table. When the triggering information is set to 1, and the terminal selects the CQI index 15 of the CQI table 1, the CQI index 0 or 15 of the CQI table 2, the CQI index 0, 1 or 15 of the CQI table 3, or the CQI index 0, 1, or 2 of the CQI table 4, the terminal may change the CQI table, select a CQI index within the changed CQI table, and report the selected CQI index to the base station. In this case, the selected CQI index and information on the changed CQI table may be reported together to the base station. In addition, the terminal may report the initially-selected CQI index (i.e., the corresponding CQI index when the terminal selects the CQI index 15 of the CQI table 1, the CQI index 0 or 15 of the CQI table 2, the CQI index 0, 1 or 15 of the CQI table 3, or the CQI index 0, 1, or 2 of the CQI table 4) to the base station together with the CQI index selected from the changed CQI table and the information on the changed CQI table.

Then, the base station may transmit a CSI-RS to the terminal. Then, the terminal may receive the CSI-RS from the base station. The terminal may derive CSI between the base station and the terminal by using the CSI-RS received from the base station. Then, the terminal may feedback the CSI to the base station. Here, the CSI may include a PMI, an RI, and/or a CQI index. In this case, the terminal may select the CQI table according to the CQI table indication information among the CQI tables. Alternatively, the terminal may select the CQI table among the CQI tables according to a preset criterion. The preset criterion may be predefined in the technical specification. Alternatively, the preset criterion may be configured by the base station. The terminal may feedback a CQI index corresponding to a high spectral efficiency to the base station when a channel condition is good, and may feedback a CQI index corresponding to a low spectral efficiency to the base station when the channel condition is bad.

In this case, the terminal may select the CQI index 15 of the CQI table 1, the CQI index 0 or 15 of the CQI table 2, the CQI index 0, 1 or 15 of the CQI table 3, or the CQI index 0, 1, or 2 of the CQI table 4 according to the CQI table indication information. In this case, the terminal may determine whether the triggering information received from the base station is set to 0 or 1. As a result of the determination, if the triggering information is 0, the terminal may report the corresponding CQI index to the base station through the CSI without changing the CQI table. Accordingly, the base station may receive the CSI including the corresponding CQI index. Then, the base station may identify the CQI index 15 of the CQI table 1, the CQI index 0 or 15 of the CQI table 2, the CQI index 0, 1 or 15 of the CQI table 3, or the CQI index 0, 1, or 2 of the CQI table 4, and may transmit, to the terminal, CQI table indication information instructing the terminal to change a CQI table to be used later to the table indicated by the identified CQI index and use the changed CQI table. In this case, the base station may transmit the CQI table indication information instructing to change the CQI table and use the changed CQI table instead of transmitting CQI table indication information indicating the changed CQI table. Accordingly, the terminal may receive the CQI table indication information instructing to change the CQI table and use the changed CQI table from the base station. Thereafter, the base station may transmit a CSI-RS to the terminal. Then, the terminal may receive the CSI-RS from the base station. The terminal may derive CSI between the base station and the terminal by using the CSI-RS received from the base station. Then, the terminal may feedback the CSI to the base station. In this case, the terminal may select the CQI table according to the CQI table indication information among the CQI tables.

On the other hand, the terminal may determine whether the triggering information received from the base station is set to 0 or 1. If the triggering information is determined to be 1, this may mean that the CQI table is to be immediately changed, and the terminal may change the CQI table to a CQI table indicated by the CQI index. In addition, the terminal may select a CQI index within the changed CQI table, and may generate CSI using the selected CQI index. Then, the terminal may feedback the CSI to the base station. In this case, the terminal may feedback the CSI including a CQI table change indicator, which is CQI table change information for informing the base station of the CQI table change. In addition, the terminal may report the initially-selected CQI index (i.e., the corresponding CQI index when the terminal selects the CQI index 15 of the CQI table 1, the CQI index 0 or 15 of the CQI table 2, the CQI index 0, 1 or 15 of the CQI table 3, or the CQI index 0, 1, or 2 of the CQI table 4) to the base station together with the CQI index selected from the changed CQI table and information on the changed CQI table.

Meanwhile, the base station may receive the CSI from the terminal, and may determine an MCS level to be used for downlink based on the received CSI. In this case, when the base station receives the CSI including a CQI table up change indicator or a CQI table down change indicator from the terminal, the base station may change the CQI table to the corresponding CQI table, and determine an MCS level to be used for downlink by referring to the changed CQI table. Then, the base station may deliver the determined MCS level to the terminal by using a DCI. Accordingly, the terminal may receive the DCI from the base station, and may identify the MCS level included in the DCI. Thereafter, the base station may transmit data to the terminal on a PDSCH by using the determined MCS. Then, the terminal may receive the data by using the MCS level indicated by the base station.

The exemplary embodiments of the present disclosure may be implemented as program instructions executable by a variety of computers and recorded on a computer readable medium. The computer readable medium may include a program instruction, a data file, a data structure, or a combination thereof. The program instructions recorded on the computer readable medium may be designed and configured specifically for the present disclosure or can be publicly known and available to those who are skilled in the field of computer software.

Examples of the computer readable medium may include a hardware device such as ROM, RAM, and flash memory, which are specifically configured to store and execute the program instructions. Examples of the program instructions include machine codes made by, for example, a compiler, as well as high-level language codes executable by a computer, using an interpreter. The above exemplary hardware device can be configured to operate as at least one software module in order to perform the embodiments of the present disclosure, and vice versa.

While the embodiments of the present disclosure and their advantages have been described in detail, it should be understood that various changes, substitutions and alterations may be made herein without departing from the scope of the present disclosure.

What is claimed is:

1. An operation method of a base station in a communication system, the operation method comprising:
   transmitting first indication information to a terminal, the first indication information indicating use of a first channel quality information (CQI) table among CQI tables;
   transmitting a first reference signal to the terminal; and
   receiving first channel state information (CSI) from the terminal, the first CSI including a first CQI index selected within the first CQI table based on the first reference signal,
   wherein the CQI tables include the first CQI table and a second CQI table, and a spectral efficiency indicated by at least one CQI index within the first CQI table is identical to a spectral efficiency indicated by at least one CQI index within the second CQI table, and
   wherein the first indication information further includes triggering information indicating scheme of changing a CQI table used for CSI reporting.

2. The operation method according to claim 1, further comprising, before the transmitting of the first indication information to the terminal, transmitting configuration information of the CQI tables to the terminal.

3. The operation method according to claim 1, wherein the first indication information further includes information indicating a valid time interval of the first CQI table indicated by the first indication information, and the first CQI table is used for reporting the first CSI within the valid time interval.

4. The operation method according to claim 1, wherein the CQI table is changed by the base station when the triggering information indicates a first scheme, and the CQI table is changed by the terminal when the triggering information indicates a second scheme.

5. The operation method according to claim 1, wherein each of the CQI tables further includes a table change request index for requesting a CQI table change, the CQI table is changed by the base station when the triggering information indicates a first scheme, and the CQI table is changed by the terminal when the triggering information indicates a second scheme.

6. The operation method according to claim 5, further comprising, when the first CQI index is the table change request index and the first scheme is used, transmitting second indication information indicating use of a third CQI table to the terminal.

7. The operation method according to claim 5, wherein when the first CQI index is the table change request index and the second scheme is used, the first CSI further includes a third CQI index selected within a third CQI table.

8. The operation method according to claim 1, further comprising:
   determining an MCS level based on the first CQI index; and
   transmitting downlink control information (DCI) including the MCS level based on the first CQI index to the terminal.

9. An operation method of a terminal in a communication system, the operation method comprising:
   receiving first indication information from a base station, the first indication information indicating use of a first channel quality information (CQI) table among CQI tables;
   receiving a first reference signal from the base station;
   selecting a first CQI index within the first CQI table based on the first reference signal; and
   transmitting first channel state information (CSI) to the base station, the first CSI including the first CQI index,
   wherein the CQI tables include the first CQI table and a second CQI table, and a spectral efficiency indicated by at least one CQI index within the first CQI table is identical to a spectral efficiency indicated by at least one CQI index within the second CQI table, and
   wherein the first indication information further includes triggering information indicating a scheme of changing a CQI table used for CSI reporting.

10. The operation method according to claim 9, further comprising, before the receiving of the first indication information, receiving configuration information of the CQI tables from the base station.

11. The operation method according to claim 9, wherein the CQI table is changed by the base station when the triggering information indicates a first scheme, and the CQI table is changed by the terminal when the triggering information indicates a second scheme.

12. The operation method according to claim 9, wherein each of the CQI tables further includes at least one table change request index for requesting a CQI table change, the CQI table is changed by the base station when the triggering information indicates a first scheme, and the CQI table is changed by the terminal when the triggering information indicates a second scheme.

13. The operation method according to claim 12, further comprising:
   when the first CQI index is the table change request index and the second scheme is used, selecting a third CQI index within a third CQI table based on the first reference signal; and transmitting third CSI including the selected third CQI index to the base station.

14. A terminal comprising:

a processor;

a memory electronically communicating with the processor; and instructions stored in the memory, wherein when executed by the processor, the instructions cause the terminal to:

receive first indication information from a base station, the first indication information indicating use of a first channel quality information (CQI) table among CQI tables;

receive a first reference signal from the base station;

select a first CQI index within the first CQI table based on the first reference signal; and transmit first channel state information (CSI) to the base station, the first CSI including the first CQI index, wherein the CQI tables include the first CQI table and a second CQI table, and a spectral efficiency indicated by at least one CQI index within the first CQI table is identical to a spectral efficiency indicated by at least one CQI index within the second CQI table, and wherein the first indication information further includes triggering information indicating a scheme of changing a CQI table used for CSI reporting.

15. The terminal according to claim 14, wherein the CQI table is changed by the base station when the triggering information indicates a first scheme, and the CQI table is changed by the terminal when the triggering information indicates a second scheme.

16. The terminal according to claim 14, wherein each of the CQI tables further includes at least one table change request index for requesting a CQI table change, the CQI table is changed by the base station when the triggering information indicates a first scheme, and the CQI table is changed by the terminal when the triggering information indicates a second scheme.

17. The terminal according to claim 16, wherein the instructions further cause the terminal to:

when the first CQI index is the table change request index and the second scheme is used, select a third CQI index within a third CQI table based on the first reference signal; and transmit third CSI including the selected third CQI index to the base station.

* * * * *